US008982963B2

(12) United States Patent
Gish et al.

(10) Patent No.: US 8,982,963 B2
(45) Date of Patent: Mar. 17, 2015

(54) COMPATIBLE COMPRESSION OF HIGH DYNAMIC RANGE, VISUAL DYNAMIC RANGE, AND WIDE COLOR GAMUT VIDEO

(75) Inventors: Walter Gish, Oak Park, CA (US); Zhen Li, Cupertino, CA (US); Christopher Vogt, Laguna Niguel, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1000 days.

(21) Appl. No.: 13/091,311

(22) Filed: Apr. 21, 2011

(65) Prior Publication Data
US 2011/0194618 A1 Aug. 11, 2011

Related U.S. Application Data

(63) Continuation-in-part of application No. PCT/US2010/026953, filed on Mar. 11, 2010.

(60) Provisional application No. 61/159,964, filed on Mar. 13, 2009.

(51) Int. Cl.
*H04N 7/50* (2006.01)
*G06T 5/50* (2006.01)
(Continued)

(52) U.S. Cl.
CPC ......... *G06T 5/50* (2013.01); *G06T 2207/20208* (2013.01); *H04N 19/70* (2014.11);
(Continued)

(58) Field of Classification Search
CPC .... G06T 5/007; H04N 5/2355; H04N 5/2356; H04N 19/30; H04N 19/36; H04N 19/59; H04N 19/61; H04N 19/63; H04N 19/70
USPC ............... 375/240.09, 240.1, 240.15, 240.18, 375/240.21, 240.16, 240.24, 240.26; 382/166, 167, 254, 299, 162; 345/590, 345/594, 604, 605
See application file for complete search history.

(56) References Cited

U.S. PATENT DOCUMENTS 6,326,977 B1 * 12/2001 Westerman .................... 345/591
6,873,368 B1 3/2005 Yu
(Continued)

FOREIGN PATENT DOCUMENTS

EP 1827024 8/2007
JP 2007243942 A1 9/2007
(Continued)

OTHER PUBLICATIONS

T. Jinno, M. Okuda, and N. Adami, "Acquisition and encoding of high dynamic range images using inverse tone mapping," in International Conference Image Processing, 2007, pp. 181-184 vol. 4.*
(Continued)

*Primary Examiner* — Jorge L Ortiz Criado
*Assistant Examiner* — Daniel Chang
(74) *Attorney, Agent, or Firm* — Fish & Richardson P.C.

(57) ABSTRACT

A first image stream has a first dynamic range and a first color space. First and the second image streams are received in a layered codec. The second image stream has a second dynamic range, which is higher than the first dynamic range. The first image stream is in the codec's base layer; the second image stream is in its enhancement layer. The first image stream is encoded to obtain an encoded image stream, which is decoded to obtain a decoded image stream. The decoded image stream is converted from the first non-linear or linear color space to a second, different color space to obtain a color converted image stream. A higher dynamic range image representation of the color converted image stream is generated to obtain a transformed image stream. Inverse tone mapping parameters are generated based on the transformed image stream and the second image stream.

29 Claims, 15 Drawing Sheets

(51) Int. Cl.
  *H04N 19/70* (2014.01)
  *H04N 19/30* (2014.01)
  *H04N 19/63* (2014.01)
  *H04N 19/61* (2014.01)
  *H04N 19/59* (2014.01)
  *H04N 19/36* (2014.01)

(52) U.S. Cl.
  CPC .............. *H04N 19/30* (2014.11); *H04N 19/63* (2014.11); *H04N 19/61* (2014.11); *H04N 19/59* (2014.11); *H04N 19/36* (2014.11)
  USPC .............. 375/240.25; 375/240.1; 375/240.16; 375/240.24; 375/240.26; 345/590; 345/591; 345/604; 345/605; 382/162; 382/166

(56) References Cited

U.S. PATENT DOCUMENTS

| | | | | |
|---|---|---|---|---|
| 2005/0013509 | A1* | 1/2005 | Samadani | 382/302 |
| 2005/0259729 | A1* | 11/2005 | Sun | 375/240.1 |
| 2006/0104533 | A1* | 5/2006 | Daly et al. | 382/254 |
| 2008/0137990 | A1* | 6/2008 | Ward | 382/299 |
| 2009/0003718 | A1 | 1/2009 | Liu | |
| 2009/0097561 | A1* | 4/2009 | Chiu et al. | 375/240.16 |
| 2009/0110073 | A1* | 4/2009 | Wu et al. | 375/240.15 |

FOREIGN PATENT DOCUMENTS

| | | |
|---|---|---|
| JP | 2008234315 A | 10/2008 |
| RU | 2107406 | 3/1998 |
| WO | 2005104035 | 11/2005 |
| WO | 2007082562 | 7/2007 |
| WO | WO 2007082562 A2 * | 7/2007 |
| WO | 2008019524 | 2/2008 |
| WO | 2008043198 | 4/2008 |
| WO | WO 2008043198 A1 * | 4/2008 |
| WO | 2008049445 | 5/2008 |
| WO | 2008049446 | 5/2008 |
| WO | 2008052007 | 5/2008 |
| WO | WO 2009127231 A1 * | 10/2009 |

OTHER PUBLICATIONS

Mantiuk, et al., "Backward Compatible High Dynamic Range MPEG Video Compression" Proceedings of Siggraph 2006, ACM Trans. Graphics 25(3).

Larson, et al., "The LogLuv Encoding for Full Gamut, High Dynamic Range Images", Journal of Graphics Tools, 3(1) pp. 15-31, 1998.

Poynton, Charles, "Digital Video and HDTV" Algorithms and Interfaces, Morgan Kaufman Publishers, 2004.

Reinhard, et al. "High Dynamic Range Imaging: Acquisition, Display, and Image-Based Lighting" Morgan Kaufmann Publishers, San Francisco, 2005.

Reinhard, et al., "Photographic Tone Reproduction for Digital Images" Proceedings of Siggraph 2002, ACM Trans Graphics, 21(3), 267-276, Aug. 2002.

Rempel, et al., "Ldr2Hdr:One-the-Fly Reverse Tone Mapping of Legacy Video and Photographs", Proceedings of Siggraph 2007, ACM Trans. Graphics 26(3), Aug. 2007.

Ward, et al., "JPEG-HDR: A Backwards-Compatible, High Dynamic Range Extension to JPEG" Proceedings of the Thirteenth Color Imaging Conference, Nov. 2005, pp. 1-8.

Segall, et al., "Tone Mapping SEI Message" JVT Team of ISO/IEC MPEG, 19th meeting, Geneva, Switzerland, Apr. 1-10, 2006.

Winken, et al., "Bit-Depth Scalable Video Coding" Fraunhofer Institute for Telecommunications, 2007, IEEE, pp. 1-8.

Winken, et al., "Bit-depth Scalability in SVC" ITU study group 16 Video Coding Experts Group, Jan. 14, 2007.

Japanese Office Action issued in 2011-554191 on Jan. 28, 2014, with English Translation, 7 pages.

* cited by examiner

COMPATIBLE COMPRESSION OF HIGH DYNAMIC RANGE, VISUAL DYNAMIC RANGE, AND WIDE COLOR GAMUT VIDEO

RELATED APPLICATIONS

The present application is a Continuation in Part (CIP) of a co-pending International Patent Application that was filed pursuant to the Patent Cooperation Treaty (PCT) by Walter C. Gish, et al. on 11 Mar. 2010 and has International Application Number PCT/US2010/026953 and International Publication Number WO 2010/105036 A1, and which claims the benefit of U.S. Provisional Patent Application No. 61/159,964, which was filed by Walter C. Gish, et al. on 13 Mar. 2009. The present CIP Application claims benefit of both said related Applications, to the full extent that may be permissible.

TECHNOLOGY

This disclosure relates generally to video technology, and more particularly, to video coding, processing, and/or compression.

BACKGROUND

Images portrayed on today's video displays, such as CRTs, LCDs and plasma displays, tend to have a defined color gamut and a dynamic range within the standard dynamic range (SDR; sometimes referred to as "low dynamic range" or "LDR") region.

The term "dynamic range" for an image may refer to a range of an image characteristic (e.g., brightness, luminance) or a ratio of a strongest measure or intensity of that image characteristic to a weakest measure or intensity of that image characteristic. In some cases the weakest measure or intensity of that image characteristic may be noise. In some cases the image characteristic may be luminance, color, a combination of luminance and color, or a function of luminance and/or color. Dynamic range may also be referred to as the ratio between the brightest possible and the dimmest possible, but not black, pixels in an image. This may be subtly different from the contrast ratio, which can be referred to as the ratio between the brightest pixels and black (e.g., off pixels). The human visual system can be capable of over ten orders of magnitude in overall dynamic range, and can have a simultaneously visible dynamic range of around 5 to 6 orders of magnitude. Video displays may have 2 to 3 orders of magnitude in dynamic range.

Color gamut may refer to the space of all colors that can be captured or displayed for a particular device. Video and computer displays may represent colors within a triangle whose vertices are the chromaticity of the red, green, and blue primaries in any of the CIE color diagrams.

BRIEF DESCRIPTION OF DRAWINGS

Like reference numbers and designations in the various drawings can indicate like elements.

DESCRIPTION OF EXAMPLE EMBODIMENTS

Figure 1A:
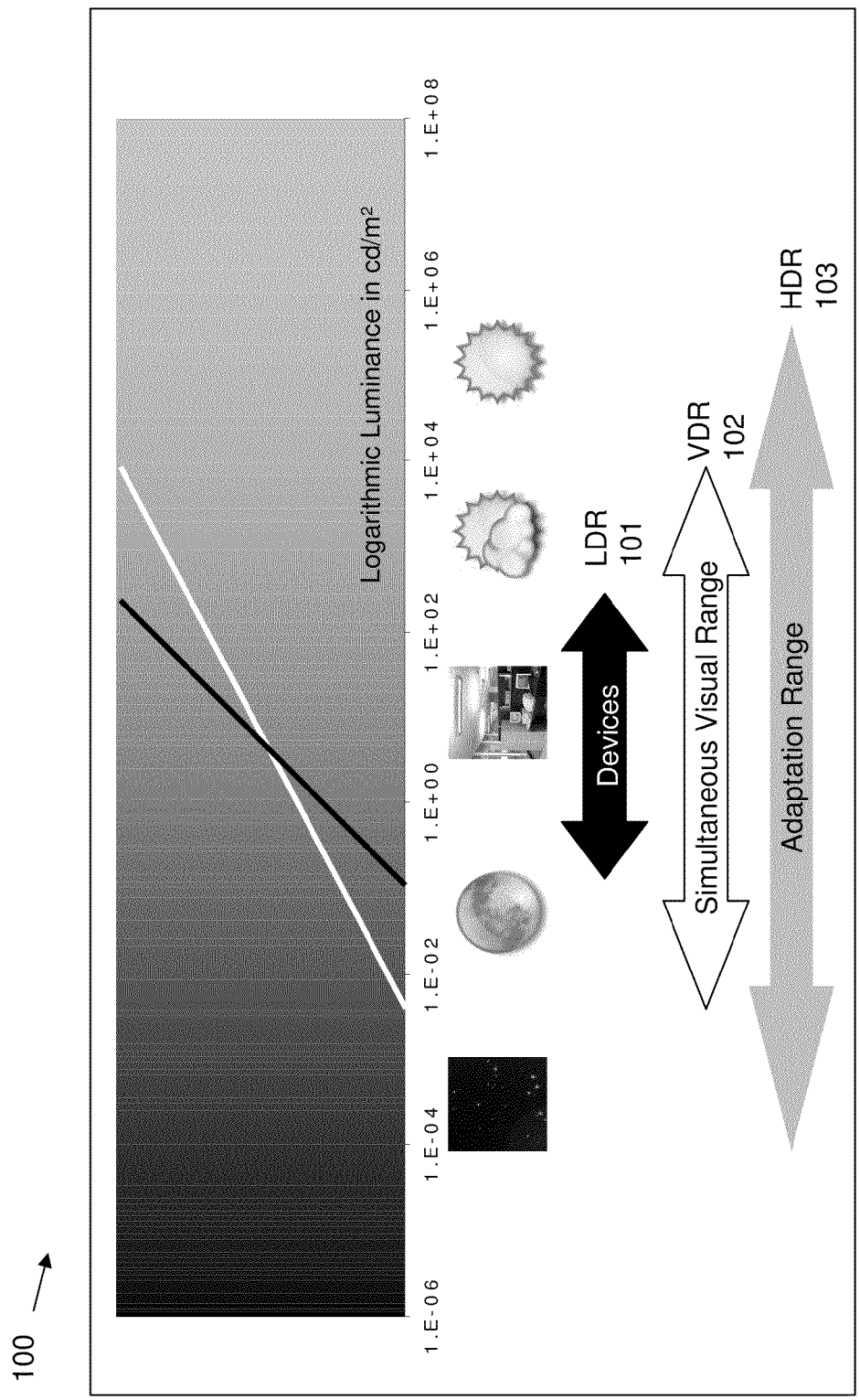
FIG. 1A depicts a diagram with an example to distinguish the dynamic range for high dynamic range (HDR), standard (e.g., low) dynamic range (SDR), and visual dynamic range (VDR).

Example embodiments relating to video compression and video coding are described herein. In the following description, for the purposes of explanation, numerous specific details are set forth in order to provide a thorough understanding of various embodiments. It will be apparent, however, that these embodiments may be practiced without these specific details. In other instances, structures and devices are shown in block diagram form in order to avoid unnecessarily obscuring other features. The details of one or more embodiments are set forth in the accompanying drawings and the description below. Other features, objects, and aspects are apparent from the description and drawings, and from the claims.

Overview

Some embodiments of the disclosed techniques involve a method of coding video. A method involves generating an encoded video stream with a video encoder, where the encoded video stream has a dynamic range of 5 to 6 orders of magnitude ($10^5$ to $10^6$) for luminance.

These and other embodiments can optionally include one or more of the following features. The generation of the encoded video stream can include generating the encoded video stream in a visual dynamic range (VDR) format for video, where the VDR format can encompass a range of luminance and a visual color gamut (VCG) that a human visual system can simultaneously perceive. The VCG can include all color that the human visual system can simultaneously perceive, where the range of luminance can include a dynamic range of human eye perception for the luminance, and VCG can include a Wide Color Gamut (WCG). The VDR format for video can have 32 bits per pixel, where the 32 bits per pixel can include 12 bits of luminance and 10 bits for each of two color channels.

In other general aspects, techniques involve a method of encoding a video stream with a video encoder using 32 bits per pixel, where the 32 bits per pixel includes 12 bits of luminance and 10 bits for each of two color channels.

These and other embodiments can optionally include one or more of the following features. The encoded video stream can include data for video having a visual dynamic range (VDR). A dynamic range of VDR can have 5 to 6 orders of magnitude ($10^5$-$10^6$) for the luminance. A dynamic range of VDR can include a dynamic range of human eye perception for the luminance. VDR can be configured for video formats including capture, distribution, consumption, or Wide Color Gamut (WCG) formats. VDR can be represented by CIE XYZ tristimulus values, gamma encoding, log encoding, or by less than one Just Noticeable Difference (JND). The method can include computing a fixed point log-luminance $L_D$, from a physical luminance Y in cd/m$^2$, using a scale parameter S, and a bias parameter B. In the method, the computation of a fixed point log-luminance $L_D$, can include computing $L_D = \lfloor S(\log_2 Y + B) \rfloor$ and $$Y = \begin{cases} 2^{\frac{L_D + \frac{1}{2}}{S} - B}, & \text{for } L_D > 0 \\ 0, & \text{for } L_D = 0 \end{cases}.$$

The method can include using the bias parameter B to determine a range of an overall luminance in cd/m$^2$. The method can include determining a dynamic range DR using the scale parameter S and a number of bits N. The dynamic range DR can include determining $$DR = \frac{2^{\frac{2^N - 1 + 1/2}{S} - B}}{2^{\frac{1 + 1/2}{S} - B}} = 2^{\frac{2^N - 2}{S}}.$$

The method can include comprising computing (u',v') coordinates for the color channels by defining a projective transformation on XYZ tristimulus values. The method can involve transforming gamma-corrected R'G'B' values to the VDR. The process of transforming of the gamma-corrected R'G'B' values can include: converting the gamma-corrected R'G'B' values to generate RGB values by undoing a gamma correction; performing a matrix transformation on the RGB values to generate XYZ tristimulus values; converting the Y tristimulus value to a fixed-point log luminance $L_D$ using a log function and a first quantization; and converting the X and Z tristimulus values to u'$_D$ and v'$_D$ color coordinates from a projective transformation and a second quantization. The method can include selecting a dynamic range based on a range of luminance and color that a human visual system can simultaneously perceive. The encoded video stream can include data for video having a visual dynamic range (VDR), in which a dynamic range of the VDR video has 5 to 6 orders of magnitude ($10^5$-$10^6$) for the luminance.

In other aspects, techniques include a method for compression of visual dynamic range (VDR) video. The method comprises includes receiving a standard dynamic range (SDR) bit stream and a VDR bit stream in a layered codec, where the layered codec includes at least one encoder, a first decoder, and a second decoder. The method includes processing the SDR bit stream in a base layer, where the processing of the SDR bit stream includes at least one operation with the first decoder. The method includes processing the VDR bit stream in an enhancement layer, where the processing of the VDR bit stream includes at least one operation with the second decoder, and the VDR bit stream includes information that is ignored by the first decoder.

These and other embodiments can optionally include one or more of the following features. VDR video can be 32 bits per pixel, where the 32 bits per pixel can include 12 bits of luminance and 10 bits for each of two color channels. A dynamic range of the VDR video can be 5 to 6 orders of magnitude ($10^5$-$10^6$) for the luminance, in which the dynamic range of the VDR video is greater than a dynamic range of SDR video, and where the dynamic range of the VDR video is less than a dynamic range of a high dynamic range (HDR) video. The layered codec can include a type of encoder that is compliant with a H.264 format or an AVC format. The codec can be a drift-free codec. The method can involve inserting data for one or more details from an original image in the VDR bit stream that were lost as a result of creating the SDR bit stream from the original image.

The method can involve applying at least one de-contouring operation to standard dynamic range data, inverse tone mapping the de-contoured standard dynamic range data, producing a residual with high dynamic range data or visual dynamic range data, and processing the residual. The residual can involve a difference between a high dynamic range image and a prediction from a standard dynamic range image, or a difference between a visual dynamic range image and the prediction from the standard dynamic range image.

In other aspects, techniques involve a method of encoding and decoding in a codec. The method includes generating a compressed bit stream in an encoder in a codec, in which the generation of the compressed bit stream includes: receiving an input standard dynamic range (SDR) image stream in the encoder; encoding and decoding the input SDR image stream to produce a first internal SDR bit stream and a decoded SDR image stream; and transforming the decoded SDR image stream to a visual dynamic range (VDR) space by using a transform block within the encoder.

These and other embodiments can optionally include one or more of the following features. The compressed bit stream can include standard dynamic range (SDR) information within a base layer of the compressed bit stream and visual dynamic range (VDR) information within an enhancement layer of the compressed bit stream. VDR video can include 32 bits per pixel, in which the 32 bits per pixel can include 12 bits of luminance and 10 bits for each of two color channels. A dynamic range of the VDR video can include 5 to 6 orders of magnitude ($10^5$-$10^6$) for the luminance. The dynamic range of the VDR video can be greater than a dynamic range of SDR video, and the dynamic range of the VDR video can be less than a high dynamic range (HDR) video. The transformation can involve generating a fixed-point log luminance $L_D$ and color coordinates (u'$_D$,v'$_D$). The generation of the compressed bit stream in the encoder further can involve mitigating quantization artifacts in the transformed SDR with a de-contour block to produce a first de-contoured SDR bit stream. The transformation of the decoded SDR image stream to the visual dynamic range (VDR) space by using the transform block within the encoder can include: performing tone mapping (TM) analysis on the first de-contoured SDR bit stream to generate tone mapping parameters; performing inverse tone mapping (ITM) on the first de-contoured SDR bit stream; and producing a residual that is a function of a result of the inverse tone mapping and an input visual dynamic range (VDR) bit stream. The method can also involve: processing the residual; encoding the processed residual; producing a first residual bit stream; receiving the first residual bit stream, the first internal SDR bit stream, and tone mapping parameters at a formatter block; and producing the compressed bit stream at an output of the encoder. The method can involve encoding tone mapping parameters in a tone mapping encoding block. The method can include producing an output VDR bit stream in a decoder in the codec that decodes the compressed bit stream. The production of the output VDR bit stream from the decoder can include: receiving the compressed bit stream at the decoder; parsing the compressed bit stream into a second SDR bit stream, a tone mapping bit stream, and a second internal residual bit stream; decoding the second internal SDR bit stream; and transforming the decoded second internal SDR bit stream to a visual dynamic range (VDR) space in the decoder by using a transform block within the decoder. The production of the output VDR bit stream from the decoder can include: mitigating quantization artifacts in the transformed decoded another SDR with a de-contour block to produce a second de-contoured SDR bit stream; performing inverse tone mapping analysis on the second de-contoured SDR bit stream and the tone mapping bit stream; decoding and processing the another residual bit stream; and producing the output VDR bit stream in the decoder that is a function of the decoded and processed another residual bit stream and a result of the inverse tone mapping analysis. The inverse tone mapping analysis can involve computations with the tone mapping parameters. Any tone mapping or inverse tone mapping performed in the codec can include a function of a parameterized global tone mapping operator, a function of a parameterized local tone mapping operator, a function of a parameterized inverse global tone mapping operator, or a function of a parameterized inverse local tone mapping operator. Any of the parameterized local tone mapping operator or the parameterized inverse local tone mapping operator can involve a function with a plurality of quadratic curves. The residual can include a size that results into a non-visible residual image. The generation of the compressed bit stream in the encoder further can include: down-sampling the residual; and compressing the down-sampled residual. The codec can be a drift-free codec. A VDR of video can include a dynamic range with a range of 5 to 6 orders of magnitude ($10^5$-$10^6$) for a luminance of the video.

In another aspect, techniques involve a method for video processing that includes, with a video coding apparatus, decoding a first video stream having a first dynamic range to produce a first decoded stream. The method includes applying an inverted tone mapping operator to the decoded first stream in predicting a second video stream, in which the second video stream has a second dynamic range higher than the first dynamic range, and producing an output video stream from the second video stream.

These and other embodiments can optionally include one or more of the following features. The first dynamic range can be a standard dynamic range (SDR) video and the second dynamic range can be a visual dynamic range (VDR) video. The inverted tone mapping operator can include a global tone mapping operator. The inverted global tone mapping can involve a transformation from SDR luminance to VDR luminance that involves a common transformation for multiple pixels of video data of an image. The method can include computing a parameter vector for the inverted global tone mapping. The computation of the parameter vector can include computing a least-squares estimate or an error metric estimate for fitting to a polynomial function. The inverted tone mapping operator can be monotonic. The inverted tone mapping operator can include an inverted local tone mapping operator, in which the inverted local tone mapping operator can include a transformation including a mapping of SDR luminance to VDR luminance, and the transformation can be variable for multiple pixels of video data of an image. The inverted local tone mapping operator can include parameters for local variations. The inverted local tone mapping operator can include a function that has multiple quadratic curves. The inverted tone mapping operator can include parameters that correspond to or are similar to dodging or burning operations. A dynamic range of the VDR video can be 5-6 orders of magnitude ($10^5$-$10^6$) of luminance, and a dynamic range of SDR can be 2 to 3 orders of magnitude ($10^2$-$10^3$) of luminance. The dynamic range of VDR video is less than a dynamic range of high dynamic range (HDR) video. The dynamic range of high dynamic range (HDR) video can be 10-14 orders of magnitude ($10^{10}$-$10^{14}$) of luminance. The method can include computing a residual, in which the residual can be a difference between a high dynamic range image and a prediction from a standard dynamic range image, or a difference between a visual dynamic range image and the prediction from the standard dynamic range image. A size of the residual can be zero such that an image produced from the residual is a non-visible image. A size of the residual can be approximately zero such that an image produced from the residual is a non-visible image or a substantially non-visible image. The method can include handling data in an enhancement layer of the VDR video, and handling data in a base layer of the SDR video.

In other aspects, techniques involve a method of predicting a dynamic range for video. The method involves, with a video processing apparatus, predicting a first dynamic range for video by applying an inverted global tone mapping operator to an image comprising a second dynamic range, or predicting a third dynamic range for the video by applying an inverted global tone mapping operator to the image comprising the second dynamic range. The method involves producing an output video including the first dynamic range or the third dynamic range.

These and other embodiments can optionally include one or more of the following features. The first dynamic range for the video can be a high dynamic range (HDR), the second dynamic range for the video can be a standard dynamic range (SDR), and the third dynamic range for the video can be a visual dynamic range (VDR). A dynamic range of HDR video can be 10-14 orders of magnitude ($10^{10}$-$10^{14}$) of luminance, a dynamic range of VDR video can be 5-6 orders of magnitude ($10^5$-$10^6$) of luminance, and a dynamic range of SDR video can be 2 to 3 orders of magnitude ($10^2$-$10^3$) of luminance. The inverted global tone mapping can be a transformation from SDR luminance to HDR luminance that can include a common transformation for multiple pixels of the image. The method can include computing a parameter vector for the inverted global tone mapping, in which the computation of the parameter vector can include computing a least-squares estimate or an error metric estimate for fitting to a polynomial function. The inverted tone mapping operator can include an inverted local tone mapping operator, in which the inverted local tone mapping operator can have a transformation including a mapping of SDR luminance to HDR luminance. The transformation can be variable for multiple pixels of the image. The method can involve determining a parameter for each of the pixels. The method can involve generating a parameter image using the parameter for each of the pixels. The inverted local tone mapping operator can include parameters for local variations. The inverted local tone mapping operator can include an inverted parameterized local tone mapping operator including at least one function having multiple quadratic curves. The inverted local tone mapping operator or the inverted global tone mapping operator can include parameters corresponding to or similar to dodging or burning operations. The method can include producing a residual, in which the residual can be a difference between a high dynamic range image and a prediction from a standard dynamic range image, or a difference between a visual dynamic range image and the prediction from the standard dynamic range image. A size of the residual can be zero such that an image produced from the residual is a non-visible image. A size of the residual can be approximately zero such that an image produced from the residual is a non-visible image or a substantially non-visible image. A tone mapping operator corresponding to the inverted local tone mapping operator or the inverted global tone mapping operator can be monotonic, and the inverted local tone mapping operator or the inverted global tone mapping operator can be parameterized. The third dynamic range for the video can be a visual dynamic range (VDR) of video, in which the dynamic range of VDR video can be 5-6 orders of magnitude ($10^5$-$10^6$) of luminance.

In other aspects, techniques involve a method for performing residual processing of video data in a codec that includes an encoder and a decoder. With the encoder, the method involves low-pass filtering an input residual, down-sampling the filtered residual, encoding the down-sampled residual, and producing an output residual bit stream. With the decoder, the method involves decoding the output residual bit stream, up-sampling the decoded residual bit stream, re-constructing a frequency range in the up-sampled residual bit stream, and producing an output residual.

These and other embodiments can optionally include one or more of the following features. The video data can include VDR video, in which the VDR video can have 32 bits per pixel, and the 32 bits per pixel can include 12 bits of luminance and 10 bits for each of two color channels. A dynamic range of the VDR video can be 5 to 6 orders of magnitude ($10^5$-$10^6$) for the luminance, in which the dynamic range of the VDR video is greater than a dynamic range of SDR video, and the dynamic range of the VDR video is less than a dynamic range of a high dynamic range (HDR) video. The method can involve receiving the input residual or transmitting the output residual within an enhancement layer of a video bit stream. The codec can be a drift-free codec. The residual can be a product of a parameterized inverse tone mapping operator. The parameterized inverse tone mapping operator can include a first nonlinear region for high luminance, a second nonlinear region for low luminance, and a linear region between the first and second nonlinear regions.

Any of the methods and techniques described herein can also be implemented in a system with one or more components, an apparatus or device, a machine, a computer program product, in software, in hardware, or in any combination thereof. For example, the computer program product can be encoded on a computer-readable medium, and can include instructions to cause a data processing apparatus (e.g., a data processor) to perform one or more operations for any of the methods described herein.

The techniques with less visible residual images can represent the techniques with better coding efficiency and compression. To illustrate how these techniques can be implemented, several example embodiments are depicted and described.

High Dynamic Range (HDR), Low Dynamic Range (SDR), and Visual Dynamic Range (VDR)

The various methods that are used for the capture, representation, and presentation of images and video can have different dynamic ranges. For example, photographic negatives can have a relatively large dynamic range when compared to the dynamic range of photographic prints. Similarly, televisions and computer monitors can have a relatively low dynamic range compared to photographic negatives. High dynamic range imaging can provide enhanced image quality and fidelity.

High dynamic range (HDR) images (e.g., "scene-referred" images) strive to contain all the dynamic range in the original scene. On the other hand, standard dynamic range (SDR) images (e.g., "output-referred" or "display-referred" images) have significantly lower dynamic range and can be exemplified, for example, by 8-bit displays (e.g., SDR displays).

There are a number of applications, notably compression for distribution and display, which may be most suited for a dynamic range that is between HDR and SDR. Such applications can use a Visual Dynamic Range (VDR). VDR can encompass the luminance and color that the human visual system can simultaneously perceive. VDR systems can involve imaging systems that operate at the visual limits of human visual perception and, in some cases can encompass all of the luminance and color that the human visual system can simultaneously perceive. VDR can be an ideal dynamic range target for the distribution and consumption of motion imagery.

FIG. 1A depicts a diagram with an example to distinguish the dynamic range for high dynamic range (HDR) 103, standard dynamic range (SDR) 101, and visual dynamic range (VDR) 102. The diagram in FIG. 1A compares ranges 100, including the entire range of visible luminance (e.g., HDR), with the range of luminance that is simultaneously visible, and the range of an 8-bit gamma-mapped display (e.g., SDR). The simultaneously visible dynamic range can be the dynamic range for VDR. The dynamic range for the VDR can be less than the dynamic range for HDR but greater than the dynamic range of SDR. In some cases, the VDR may have the range of HDR minus a range from adaptation.

Quantitatively, the dynamic range of HDR can be approximately 10-14 orders of magnitude ($10^{10}$-$10^{14}$), the dynamic range of VDR can be approximately 5 to 6 orders of magnitude ($10^5$-$10^6$), and the dynamic range of SDR can be approximately 2 to 3 orders of magnitude ($10^2$-$10^3$). The human eye can typically perceive a dynamic range for luminance of approximately up to around 5 orders of magnitude ($10^5$), which is similar to the range of VDR. HDR may have a dynamic range outside of what the human eye may perceive at a single instant.

The dynamic range requirements for capture, distribution, and consumption formats can differ between HDR and VDR. HDR imaging may involve the capture and presentation of images with the full dynamic range and color spectrum that is visible to the human eye. HDR can be primarily a capture format. In addition to being a potential capture format, VDR also may be suited for distribution and consumption formats. For example, the VDR format can allow for the compression and for the wide-spread distribution of high dynamic range images, either via broadcast (e.g., over-the-air, cable, and satellite), packaged media (e.g., DVDs, Blu-Ray disks, storage media), and/or Internet downloads. The VDR format may also permit high dynamic range and wide color gamut images to be smoothly transitioned into current and future displays and their image formats.

Some embodiments of the compression associated with VDR may involve compatible compression. Compatible compression may involve creating a compressed digital stream that appears like legacy MPEG-2 or MPEG-4/AVC (H.264) to existing devices (e.g., appears like legacy MPEG-type format), yet also carries information to produce high dynamic range and wide color gamut images on devices with that capability. The compression may involve anything the human visual system could possibly perceive, and in some embodiments, may be the last transition required in terms of dynamic range and possible colors to achieve these results.

Figure 1B:
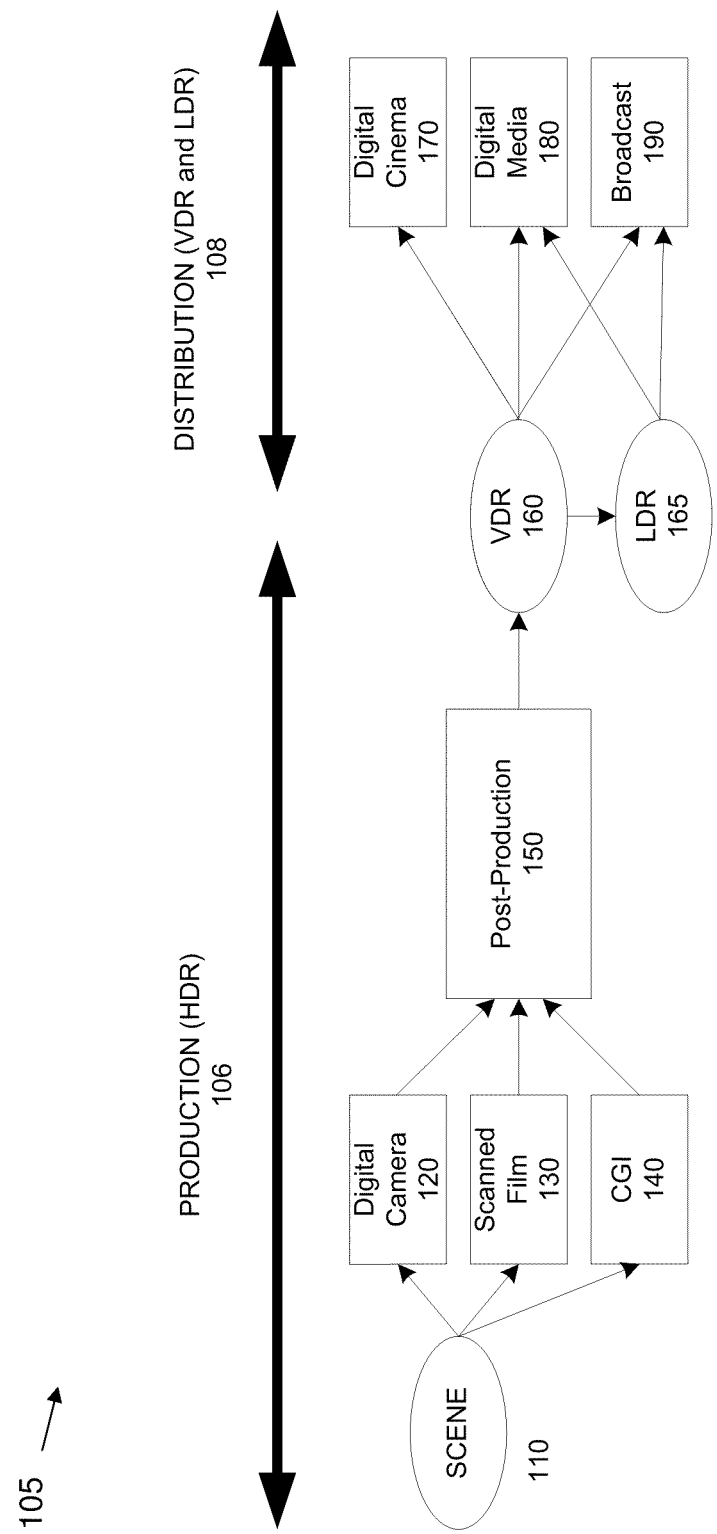
FIG. 1B depicts a diagram for the production and distribution phases for an example of a motion picture.

FIG. 1B depicts a diagram for the production and distribution phases 105 for an example of a motion picture. In the production phase 106 for the HDR image data, the original scene 110 can be captured by an HDR digital camera 120 or by a film camera and then scanned digitally 130. The live capture of real-time events can be combined with computer generated imagery (CGI) 140 in the post-production process. Both the live capture and post-production can take place in the HDR domain. After post-production is completed, the output can be fully represented as a VDR image stream 160, from which an SDR stream image stream 165 can be derived. In the distribution phase 108, the VDR image stream 160 or the SDR image stream 165 can be distributed to digital cinemas 170, digital media, such as optical disks 180, or broadcasted 190 (e.g., broadcasted both over-the-air and Internet delivery).

Any dynamic range outside of VDR can be invisible without further processing (e.g., tone-mapping). VDR can include the dynamic range of the human retina's response. VDR can provide a reasonable dynamic range target for displays.

VDR can include the entire visual color gamut. VDR can be considered a Wide Color Gamut (WCG) format. In some embodiments, a WCG format may be considered a color gamut that is larger than the color standard of digital television, which may be substantially compliant with the standard for the Recommendation 709 of the International Telecommunication Union (ITU Rec. 709). In one example of VDR, VDR can be represented very efficiently: to almost ¼ JND (just noticeable difference) in both luminance and color with 32 bits per pixel. VDR can use 32 bits per pixel to accommodate 12 bits of luminance and 10 bits for each of two color channels. The number of bits used for luminance can be greater than the number of bits used for each color channel because the human eye can be more sensitive to perceiving luminance than color. 32 bits per pixel can be useful in computers to process and transmit information (e.g., 32-bit machines, 64-bit machines). In terms of efficiency, the number of bits per pixel for VDR can be less than the number of bits used in Digital Cinema, in which 36 bits per pixel can be used.

In some embodiments, VDR data may be represented with CIE XYZ tristimulus values (e.g., values in a color space (XYZ) that can represent the proportions of elementary stimuli in a three-component additive color model that matches a test color) that are transformed into a domain that is fairly perceptually uniform before quantization to digital values. This transformation process may begin with gamma-corrected R'G'B' data, in which the R'G'B' data can first be transformed to the linear light domain, RGB, by reversing/undoing the gamma correction. The resulting RGB values can be transformed to XYZ tristimulus values by a matrix transformation. The transformations applied to the XYZ values may be a parameterized generalization of those used for a Log Luv encoding format. The XYZ values can be transformed to a log(Y) representation for luminance with (u',v') coordinates for color. Log-luminance data may be perceptually uniform for high adaptation levels, while gamma encoded luminance may be almost perceptually uniform for low adaptation levels. Consequently, gamma encoding can be more efficient for dark viewing environments, such as in theaters. For the range of luminance in most applications, however, log encoding may be able to provide better results than gamma encoding. Although log encoding may not be more efficient than gamma encoding at low light levels, this can be compensated for by the ability of log encoding to permit the increasing or the decreasing of the overall image brightness without introducing the banding (e.g., discernable steps in a smooth gradient) that would occur if gamma encoded images were used. In some embodiments, the ability of log encoding to permit the increasing or the decreasing of the overall image brightness may be important for display management in different viewing environments.

For VDR, the fixed point log-luminance, $L_D$, can be calculated from the physical luminance Y in cd/m², using a scale parameter, S, and a bias, B, as expressed in equations 1 and 2.

$$L_D = \lfloor S(\log_2 Y + B) \rfloor \quad (1)$$

$$Y = \begin{cases} 2^{\frac{L_D + \frac{1}{2}}{S} - B}, & \text{for } L_D > 0 \\ 0, & \text{for } L_D = 0 \end{cases} \quad (2)$$

In equation 2, associating the zero digital value with the zero luminance result can be similar to Log Luv encoding. The scale parameter, S, can determine a relative resolution for luminance, as expressed in equation 3.

$$\frac{\Delta Y}{Y} = \frac{2^{\frac{L_D + 1 + 1/2}{S} - B} - 2^{\frac{L_D + 1/2}{S} - B}}{2^{\frac{L_D + 1/2}{S} - B}} = 2^{1/S} - 1 \quad (3)$$

In one embodiment, if S=256, the scale factor used in Log Luv, then the resolution can be 0.27%, which is close to ¼ of the common 1% JND. The number of bits, N, for log-luminance, along with the scale parameter S, can determine the dynamic range, DR, $$DR = \frac{2^{\frac{2^N - 1 + 1/2}{S} - B}}{2^{\frac{1 + 1/2}{S} - B}} = 2^{\frac{2^N - 2}{S}}. \quad (4)$$

When S=256, then the resulting dynamic range can be a function of the number of bits, N, for log-luminance, as in the example dynamic ranges in Table 1.

TABLE 1

| N | DR @ S = 256 (~¼ JND) |
|---|---|
| 14 | $1.8 \times 10^{19}$ |
| 13 | $4.3 \times 10^9$ |
| 12 | $6.5 \times 10^4$ |

The scale factor S may allow for tuning this format to meet different requirements. For example, there may be a requirement for a dynamic range of $10^6$. By reducing S from 256 to 205, the dynamic range for N=12 can become $1.03 \times 10^6$ with a resolution of 0.33%, or roughly ⅓ JND.

The bias parameter B can be used to determine the range of overall luminance in cd/m². For example, if N=12, S=256, and B=6 then the minimum luminance $Y_{min}$ and maximum luminance $Y_{max}$ would be 0.0157 and 1022.6, respectively.

$$L_D = 1 \Rightarrow Y_{min} = 0.0157$$

$$L_D = 2^N - 1 \Rightarrow Y_{max} = 1022.6$$

Because 1.5/S can be a small value, an approximation for the minimum luminance $Y_{min}$ can be $Y_{min} \cong 2^{-B}$.

The color portion of VDR can use the (u',v') coordinates defined by a projective transformation (e.g., a transformation used in projective geometry) on the XYZ tristimulus values, $$u' = \frac{4X}{X + 15Y + 3Z} \quad v' = \frac{9Y}{X + 15Y + 3Z}, \quad (5)$$

where the inverse transformation can be expressed as $$X = \frac{9u'}{4v'} Y \quad Z = \frac{12 - 3u' - 20v'}{4v'} Y. \quad (6)$$

The fixed point representation of color using M bits, where $M \geq 8$, can be expressed as $$u'_D = \lfloor 2^{M-8}(410)u' \rfloor \quad v'_D = \lfloor 2^{M-8}(410)v' \rfloor \quad (7)$$

$$u' = \frac{u'_D + \frac{1}{2}}{2^{M-8}(410)} \quad v' = \frac{v'_D + \frac{1}{2}}{2^{M-8}(410)}.$$

The 410 factor in equation 7 can be used to map the range of (u',v'), which can be approximately [0, 0.62], into [0, 255], and can make full use of the integer range of 8 bits. At 8 bits for each component, the color resolution is under one JND.

Figure 2:
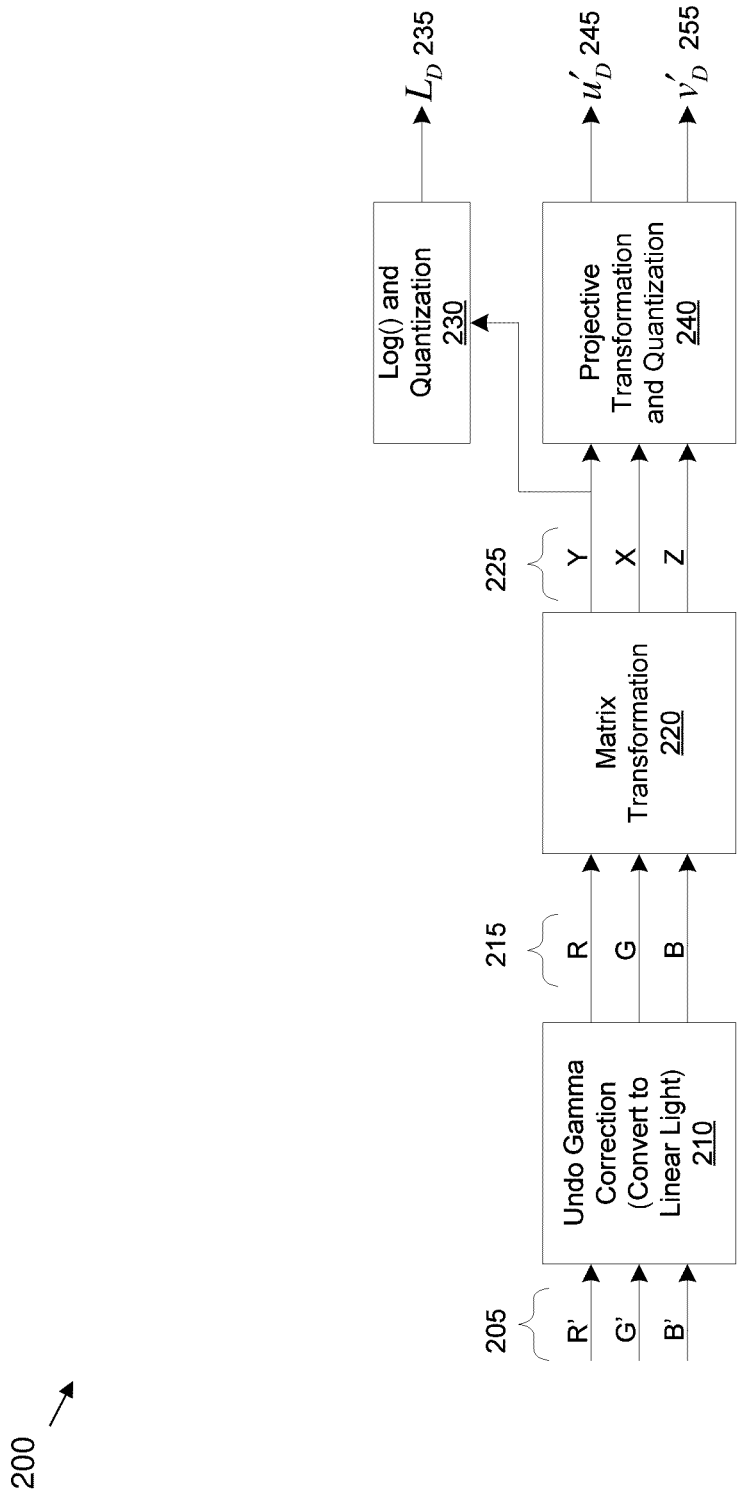
FIG. 2 depicts a diagram of an example for transformations from gamma-corrected R'G'B' to VDR format.

FIG. 2 depicts a diagram of an example for transformations 200 from gamma-corrected R'G'B' values 205 to a VDR format. In the example depicted, the transformations 200 are used to convert gamma-corrected R'G'B' values 205 to XYZ tristimulus values 225, and then to values in a VDR format. Gamma-corrected R'G'B' values 205 are first converted to linear light to generate RGB values 215 by undoing/reversing the gamma correction (210). A matrix transformation (220) is performed on the RGB values 215 to generate XYZ tristimulus values 225. The Y tristimulus value is converted to the fixed point log-luminance, $L_D$ 235, using a log function and quantization (230). The color in the XYZ tristimulus values is converted to U'$_D$ 245 and v'$_D$ 255 coordinates using a projective transformation and quantization (240). In an additional or alternative embodiment, color values other than gamma-corrected color values are transformed. For example, linear or linearized color values (e.g., RGB) may thus be transformed to a VDR format, as well as (or instead of) the gamma-corrected R'G'B' values.

In one example, when N=12 for $L_D$ and M=10 for (u'$_D$,v'$_D$) coordinates at just 32 bits per pixel, the entire range for VDR can be covered at roughly one-quarter to one-third of the JND. The HDR format may be achieved with two additional bits of log-luminance.

The efficiency of the VDR representation can be a result of separating luminance and color more completely than the XYZ or the YCrCb color spaces. Cr (e.g., blue minus luma, (B−Y)), and Cb (e.g., red minus luma, (R−Y)), as well as the X and Z tristimulus values, can be correlated with luminance and may require just as many bits for representation as HDR.

One or more embodiments below may be applicable to HDR and/or VDR systems, even though sometimes only one system, HDR or VDR, is referred to in the example. For example, the term "VDR/HDR" may denote that the high dynamic range content can be either VDR or HDR. In some embodiments, coding of HDR video or VDR video, may employ information derived from SDR video. For example, a high dynamic range image may be predicted from the standard dynamic range (SDR) image. In some cases, the residual (e.g., the difference between the predicted high dynamic range image and the standard dynamic range image) can be greatly reduced and yield enhanced coding efficiency.

Tone Mapping: Reducing the Dynamic Range of HDR and VDR

"Tone mapping" can entail the mapping of one color set to another color set, and may be used to reduce the dynamic range of HDR or VDR images. In some cases, tone mapping can reduce the dynamic range of luminance, but leave the chromaticity of each pixel unaltered. In those situations, tone mapping can modify $L_D$, but leave (u'$_D$,v'$_D$) unaltered.

There are at least two types of tone mapping operators: global tone mapping operators and local tone mapping operators. Global tone mapping can refer to a transformation that involves the same transformation for all pixels. Global tone mapping may involve a transformation from HDR or VDR luminance to SDR luminance. Local tone mapping can have a transformation that involves a transformation that can vary for different pixels. Local tone mapping also may have a transformation from HDR or VDR luminance to SDR luminance. Global tone mapping, local tone mapping, or a combination of the two can be used to map HDR or VDR luminance to VDR luminance.

For example, in one embodiment of global tone mapping, all HDR (or VDR)-type pixels with a particular luminance, e.g., L1, can be mapped to the same SDR luminance, e.g., L2. As another example, in one embodiment of local tone mapping, the luminance for these HDR (or VDR)-type pixels may be luminance L1, but the mapped SDR luminances are not all the same (e.g., the mapped SDR luminances may not all be luminance L2).

Global tone mapping operators can be more simplistic than local tone mapping operators. In global tone mapping, for example, there can be a single function for all pixels that maps HDR or VDR luminance into SDR luminance, $$\log(Y_{LDR}) = TM[\log(Y_{VDR/HDR})], \quad (8)$$

where TM[ ] is a one-to-one function. A global tone mapping operator may have an "S"-shape.

Figure 3:
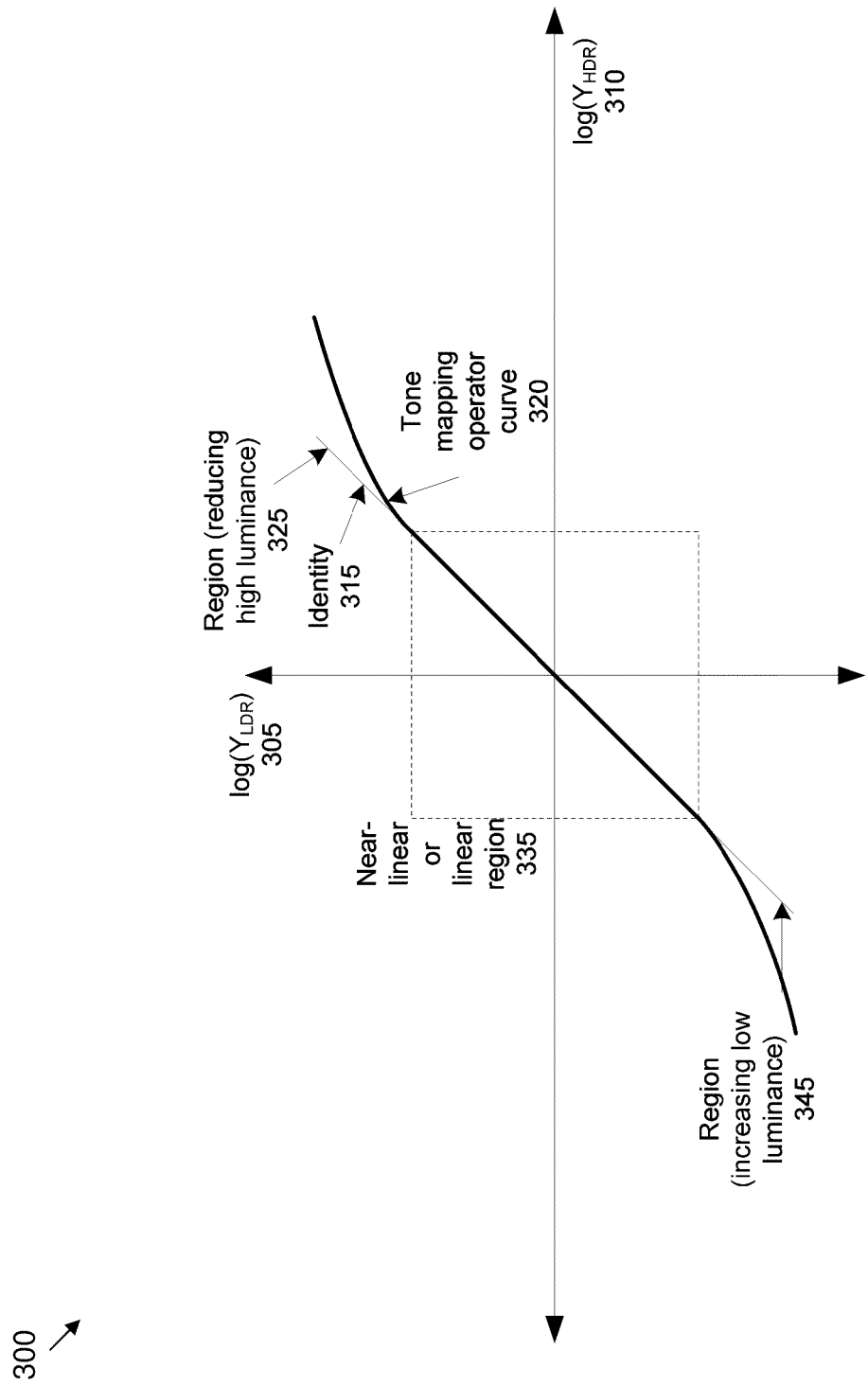
FIG. 3 depicts a diagram of an example of global tone mapping.

FIG. 3 depicts a diagram of an example of global tone mapping 300. The global tone mapping operator curve 320 is plotted for $\log(Y_{HDR})$ 310 versus $\log(Y_{LDR})$ 305. The global tone mapping operator curve 320 has an overall "S"-shape. The tone mapping operator curve can be compared with an identity shape 315 (e.g., a straight, sloped line; linear). The tone mapping operator curve 320 also has three regions: a linear or near-linear region 335 for luminance well within the standard dynamic range (SDR), and regions 325, 345 for non-linear transformations at very high and very low luminance, respectively. The tone mapping depicted in FIG. 3 is an example and may oversimplify some practical (e.g., real world) tone mapping operators at least because some of the practical tone mapping operators can differ slightly from a strict linear transformation near mid-range luminance values.

In region 325, high luminance values are reduced from the identity slope 315, while in region 345 low luminance values are increased from the identity slope 315. The deviations of the tone mapping operator 320 from the identity slope 315 can contribute to reducing the overall dynamic range. As a result, compression in the non-linear regions of luminance, regions 325, 345, can remove details in bright and/or dark areas. For example, when an SDR image derived from tone mapping is quantized to 8 bits, this compression at the extremes of luminance can remove detail in very bright and very dark areas.

Figure 4:
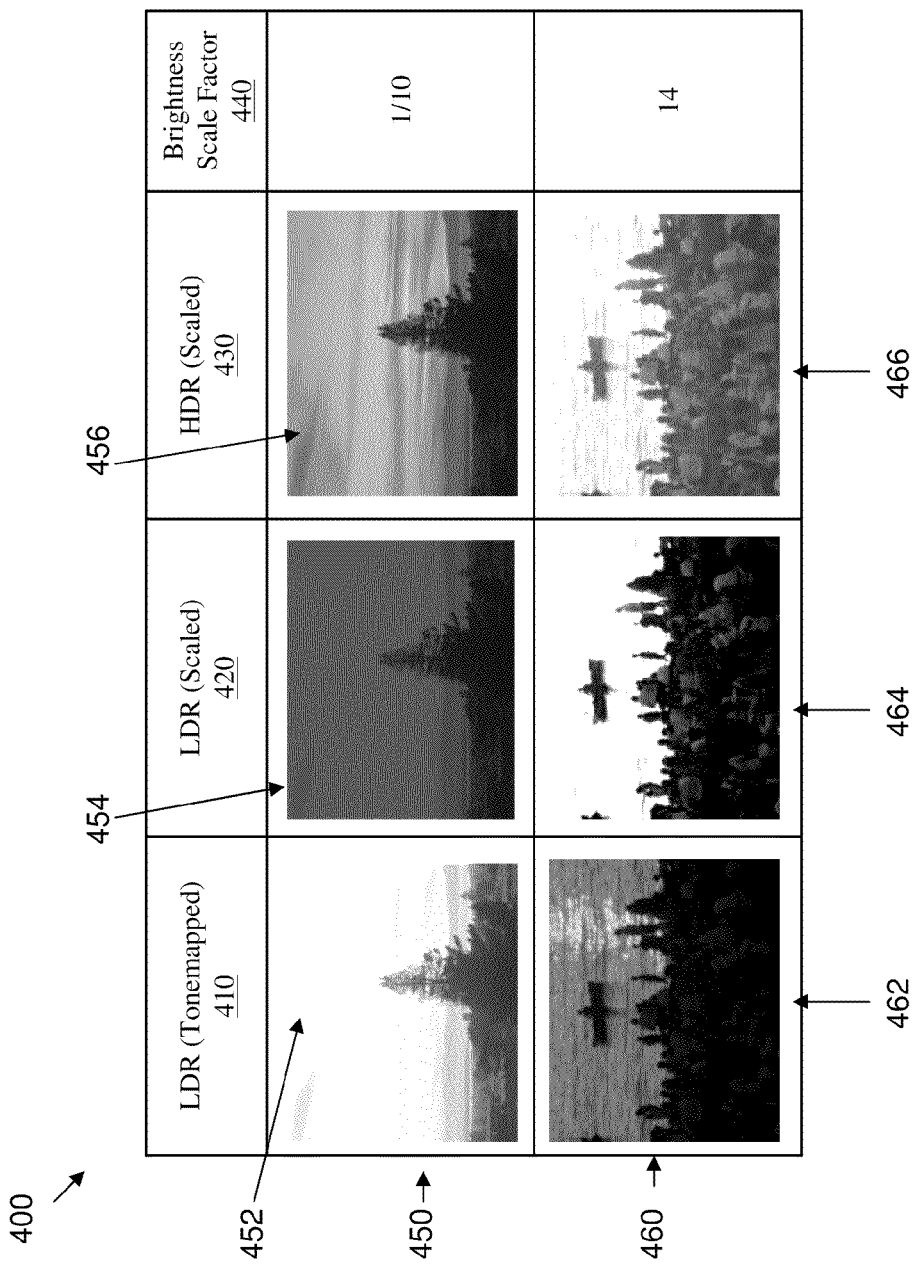
FIG. 4 depicts examples of images to illustrate a loss of detail at high and low luminance in tone mapping HDR to SDR.

FIG. 4 depicts examples of images 400 to illustrate a loss of detail at both high and low luminance in tone mapping HDR to SDR. Each row has a tone-mapped SDR image 410, a scaled version of that HDR image 420, the HDR image 430 scaled to roughly match the scaled SDR image 420, and the scale factor used from the SDR image 410 to the scaled SDR image 420. The first row 450 is used to illustrate the loss of detail at high luminance, and the second row 460 is used to illustrate the loss of detail at low luminance. In the first row 450, the SDR image 452 shows a relatively bright portion of an image. When the image 452 is scaled down by a factor of 1/10 to produce the image 454, the bright sky has less detail. However, when an HDR version 430 is scaled to roughly match the scaled SDR version 420 as illustrated by 456, details in the clouds are visible. Thus, the first row 450 illustrates that detail in a bright area of the image can be lost by tone mapping.

Conversely, the second row 460 shows the loss of detail at low luminance. The SDR image 462 shows a relatively dim area of an image of a boat and a crowd of people on shore. When the SDR image 462 is scaled up by a factor of 14, image 464 is obtained, and there is a little more visible detail showing the crowd of people. However, when the corresponding HDR version is scaled to roughly match the SDR scaled version 464, the resulting image 466 reveals much more detail in the crowd of people. Thus, tone mapping can remove detail in both the high and low luminance areas of an image.

Using tone mapping may not mean simply adding more bits for luminance or RGB. For instance, adding more bits can reveal details in the darker areas of an image, but not in the brighter portions of the image. Referring to FIG. 3, for example, adding more bits can be equivalent to a tone mapping function that is the identity function plus a fixed scaling factor. For example, going from 8 bits to 12 bits can be the identity function plus a scaling factor of 16. But simply adding more bits does not have the compression at high luminance 325, or at low luminance 345, that characterizes tone mapping.

Along with the global tone mapping operators, in which the mapping from high to standard dynamic range is the same for all pixels, there can be many local tone mapping operators where this mapping can vary from pixel to pixel. Local tone mapping operators can be viewed in terms of a family of tone mapping curves, as shown in FIG. 5.

Figure 5:
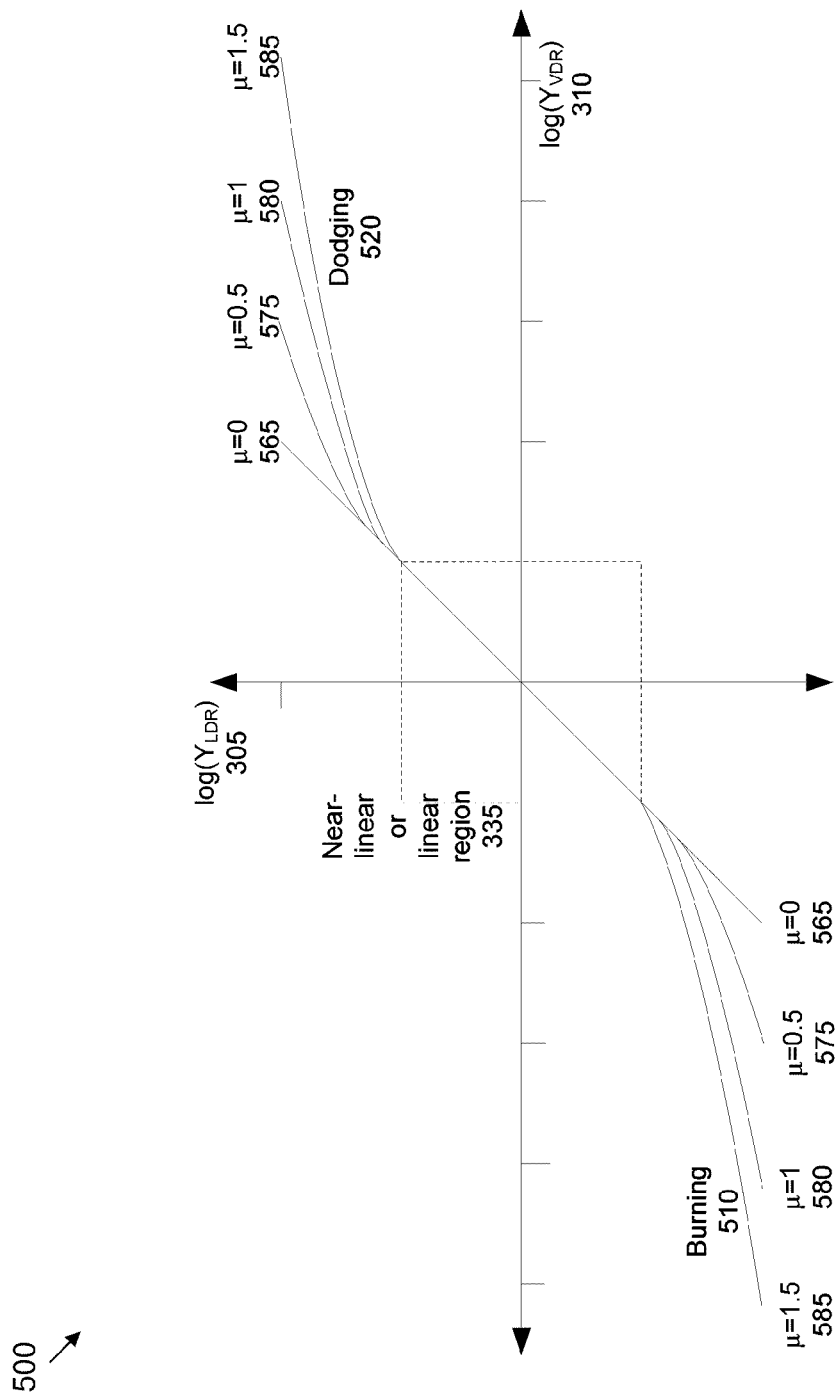
FIG. 5 depicts an example of a parameterized family of tone mapping operators.

FIG. 5 depicts an example of a parameterized family of tone mapping operators. The family of tone mapping operator curves 565, 575, 580, 585 are plotted for $\log(Y_{HDR})$ 310 versus $\log(Y_{LDR})$ 305 for parameter $\mu$. The tone mapping operator curves 575, 580, 585 have an "S"-shape when $\mu \neq 0$ (e.g., when parameter $\mu$ does not produce the identity slope for the tone mapping operator). In FIG. 5, the tone mapping operator curves 575, 580, 585 have an "S"-shape when $\mu=0.5$, $\mu=1.0$, $\mu=1.5$. Each member of this family of tone mapping operator curves, i.e., a single value of $\mu$, may correspond to a global tone mapping operator.

FIG. 5 also illustrates the analogous concepts of "dodging" 520 and "burning" 510 from photographic practice. In photography, "dodging" and "burning" can be used to manipulate the exposure of one or more areas of a photographic print, in which dodging decreases the exposure for areas that are to be made dimmer, and burning increases the exposure to areas that are to be made brighter.

In some embodiments, tone mapping operators that are not global can be considered local operators in the sense that the tone mapping can vary from pixel to pixel in some fashion, regardless of the type of mathematics that are used to represent the mapping details. Generally, more complex tone mapping operators (e.g., local tone mapping operators) may be used when the required reduction in dynamic range is large (e.g., from a dynamic range of $10^{12}$ down to $10^{2.5}$). If the dynamic range is small (e.g., VDR of $10^6$ down to $10^{2.5}$), the tone mapping operator may be a global operator. If a global tone mapping operator is not adequate, then a relatively simple tone mapping operator that mimics the dodging and burning of conventional photographic practice and post-production may suffice. One example of this simple tone mapping operator can include the Reinhard tone mapping operator.

Thus, SDR images can be considered to be tone mapped HDR or VDR images. In this case, the HDR or VDR images may retain detail both above and below the dynamic range available for SDR video signals. Consequently, one manner of providing compatible compression (e.g., generating a compressed bit stream that is compatible with SDR coders and/or decoders) of VDR/HDR data can involve encoding and decoding the reinsertion of details that are lost in the creation of the SDR data. Accordingly, one manner of providing compression of VDR/HDR data can involve encoding information that can be used to generate VDR/HDR data through inverse tone mapping of SDR data, and include this encoded information with the encoded SDR data.

In some embodiments, VDR/HDR can be generated, at least primarily, from inverted global tone mapping. In such embodiments were VDR/HDR may be generated from inverted global tone mapping, tone mapping analysis can be performed. In some embodiments, inverted global tone mapping can be applied to the decoded and transformed SDR to provide a predictor for VDR/HDR. In some embodiments for the VDR/HDR, the residual (e.g., the correction signal) can be determined, processed, and decoded. The information for VDR/HDR may include the information for the enhancement layer.

In some embodiments, an SDR image may be part of a tone mapping operator that is applied to VDR/HDR. In some of these embodiments, when trying to go from SDR to VDR/HDR, the large change in the dynamic range may require that a local tone mapping should be used. In some embodiments, global tone mapping may involve an entire image (e.g., the "S" curve), and local tone mapping may involve local variations, where the local variations can be parameterized. Quantization and coding error correction may also be considered in these embodiments.

Inverse Tone Mapping for Prediction

Because SDR can be obtained by tone mapping HDR and/or VDR, applying an inverse tone mapping operator to an SDR image can produce an approximation to the targeted HDR and/or VDR image. In one example, if a function of the SDR luminance at image pixel $\vec{x}$, $Y_{LDR}(\vec{x})$, is expressed as $$\log(Y_{LDR}(\vec{x})) = TM[\log(Y_{VDR}(\vec{x}))], \qquad (9)$$

where $Y_{LDR}(\vec{x})$ and $Y_{VDR}(\vec{x})$ are the luminance images for SDR and VDR, and TM[ ] is a general tone mapping operator, then $$\log(Y_{VDR}(\vec{x})) \approx TM^{-1}[\log(Y_{LDR}(\vec{x}))], \text{ where} \qquad (10)$$

$TM^{-1}[\ ]$ is a general inverse tone mapping operator.

Because of the coarser quantization in the SDR image and the possibility that the inverse tone mapping is not known exactly, a correction may be included, which is referred to as the "residual" $R(\vec{x})$. The residual $R(\vec{x})$ can be added to $TM^{-1}[\ ]$ to increase the accuracy of the resulting HDR and/or VDR image, as expressed in equation 11.

$$\log(Y_{VDR}(\vec{x})) = TM^{-1}[\log(Y_{LDR}(\vec{x}))] + R(\vec{x}) \qquad (11)$$

Some embodiments involve methods for improving the accuracy of this inverse tone mapping operation. By improving the accuracy of the inverse tone mapping, the size of the residual $R(\vec{x})$ can be reduced.

In some embodiments, if the original tone mapping operator is global and known, then its inverse can be used and directly applied to the SDR luminance images. If the global tone mapping operator is unknown, the estimation of this operator can be resolved with statistical estimation techniques, by balancing a number of variables or unknown parameters describing the inverse tone mapping with the accuracy with which these variables or unknown parameters can be determined.

Codec Example

Figure 6:
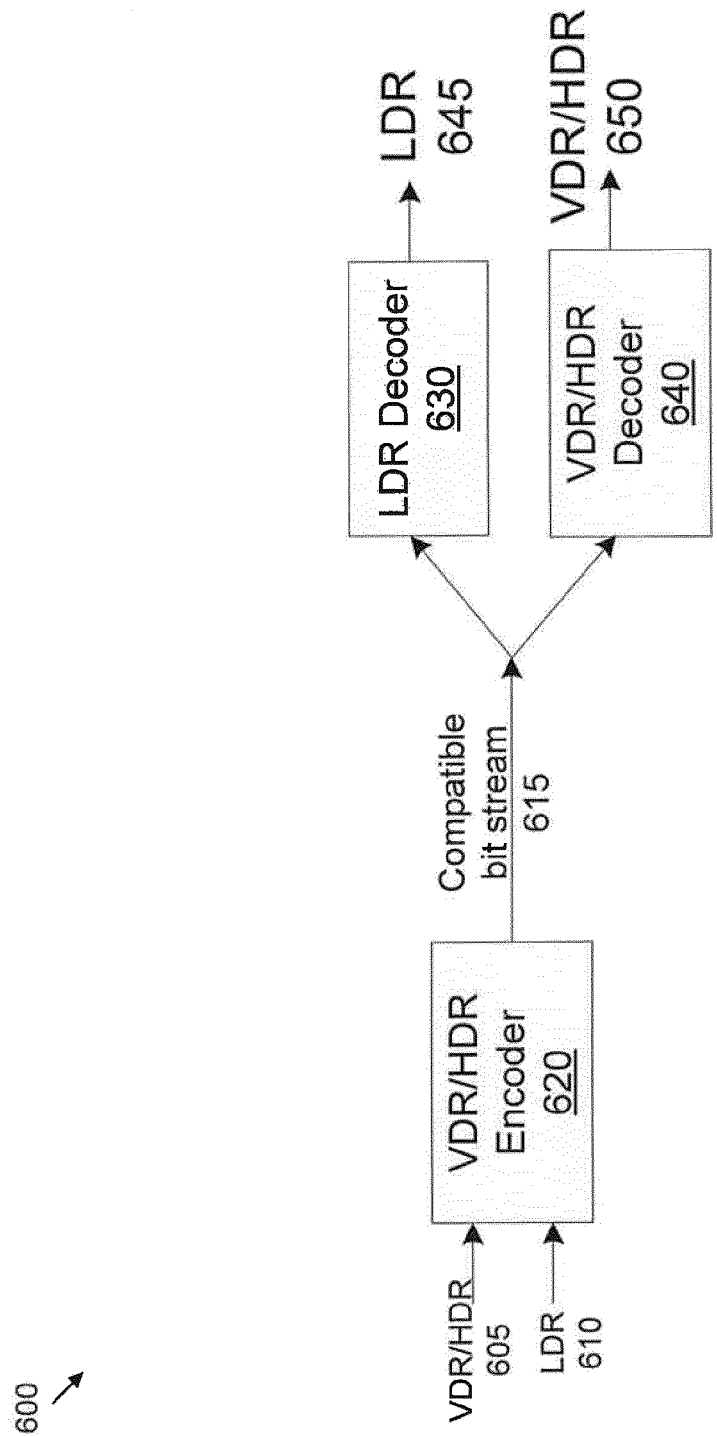
FIG. 6 depicts an example of a compatible codec.

FIG. 6 depicts an example of a compatible codec 600. The codec 600 includes a VDR/HDR encoder 620, an SDR decoder 630, and a VDR/HDR decoder 640. The VDR/HDR encoder 620 can receive a VDR/HDR image stream 605 and a corresponding SDR image stream 610 and form a compatible bit stream 615 from the VDR/HDR image stream 605 and the corresponding SDR image stream 610. The bit stream 615 can have two components. One component can be interpreted and decoded by SDR decoders 630 to produce an output SDR image stream 645 corresponding to the input SDR image stream 610. The second component can include the information that permits a VDR (or HDR) image stream to be generated from the compatible bitstream 615. The second component is packaged in such a way that the VDR/HDR information can be ignored by a standard SDR decoder 630. Such coding architectures may be referred to as "layered codecs." In this case, the encoded SDR from the first component can form a base layer, and the encoded VDR/HDR additional information for the second component can be in an enhancement layer. The information from the first and second components can be decoded with an VDR/HDR decoder 640 to produce an output VDR (or HDR) image stream 650 corresponding to the input VDR/HDR 605. A compatible codec may refer to a codec that can produce a compressed bit stream that is compatible with existing, standard SDR decoders. Some types of compatible codecs can include JPEG HDR-type compatible codecs for still images, and MPEG HDR-type compatible codecs for image sequences, such as video or digital cinema. In JPEG HDR and MPEG HDR-type codecs, the SDR and residual are correlated. This effect can be seen by visually comparing the SDR and the two residuals, in which the original image in the residual can be seen in varying degrees. When the SDR and the residual are correlated, the same information may be encoded twice: one encoding in the SDR and another encoding in the HDR (or VDR) enhancement layer (to varying degrees). Encoding the same information twice may affect the coding of both JPEG HDR and MPEG HDR.

Enhanced Coding Efficiency in VDR, HDR and WCG Video

As described and shown herein, embodiments can enhance coding efficiency for compatibly encoding higher dynamic range video, such as VDR or HDR video, along with encoding lower dynamic range video, such as an SDR-compressed bit stream. The prediction for the HDR or VDR image can be enhanced by modifying the inverse tone mapping that is used to predict HDR or VDR images from their corresponding SDR images.

Some embodiments can use a representation for HDR or VDR that employs a logarithmic representation for luminance for the HDR or VDR image. The log-luminance techniques can allow for low complexity without reducing coding efficiency.

Some embodiments can provide techniques to apply de-contouring operations to the SDR prior to inverse tone mapping to reduce quantization artifacts in the SDR.

Some embodiments can use a general, parameterized formulation for global inverse tone mapping operation to predict the HDR or VDR from the SDR. These embodiments can allow for the enforcement of targeted properties for tone mapping, such as monotonicity, while minimizing statistical error in the estimation of the tone mapping. For example, by imposing parameterized forms for the tone mapping with a number of parameters (e.g., less than 255 parameters) the statistical reliability of those parameters can be made robust and a small (or no) residual may result.

Some embodiments can use a parameterized local inverse tone mapping, which may include compression of the parameter image.

Some embodiments can use drift-free codecs for the SDR and the residual.

Some embodiments can down-sample the residual prior to the compression of the residual.

Some embodiments can have a compatible encoder that can include operations for an alignment of SDR and HDR color and luminance, a tone mapping analysis and residual computation, and a residual compression.

A Codec Framework

Figure 7:
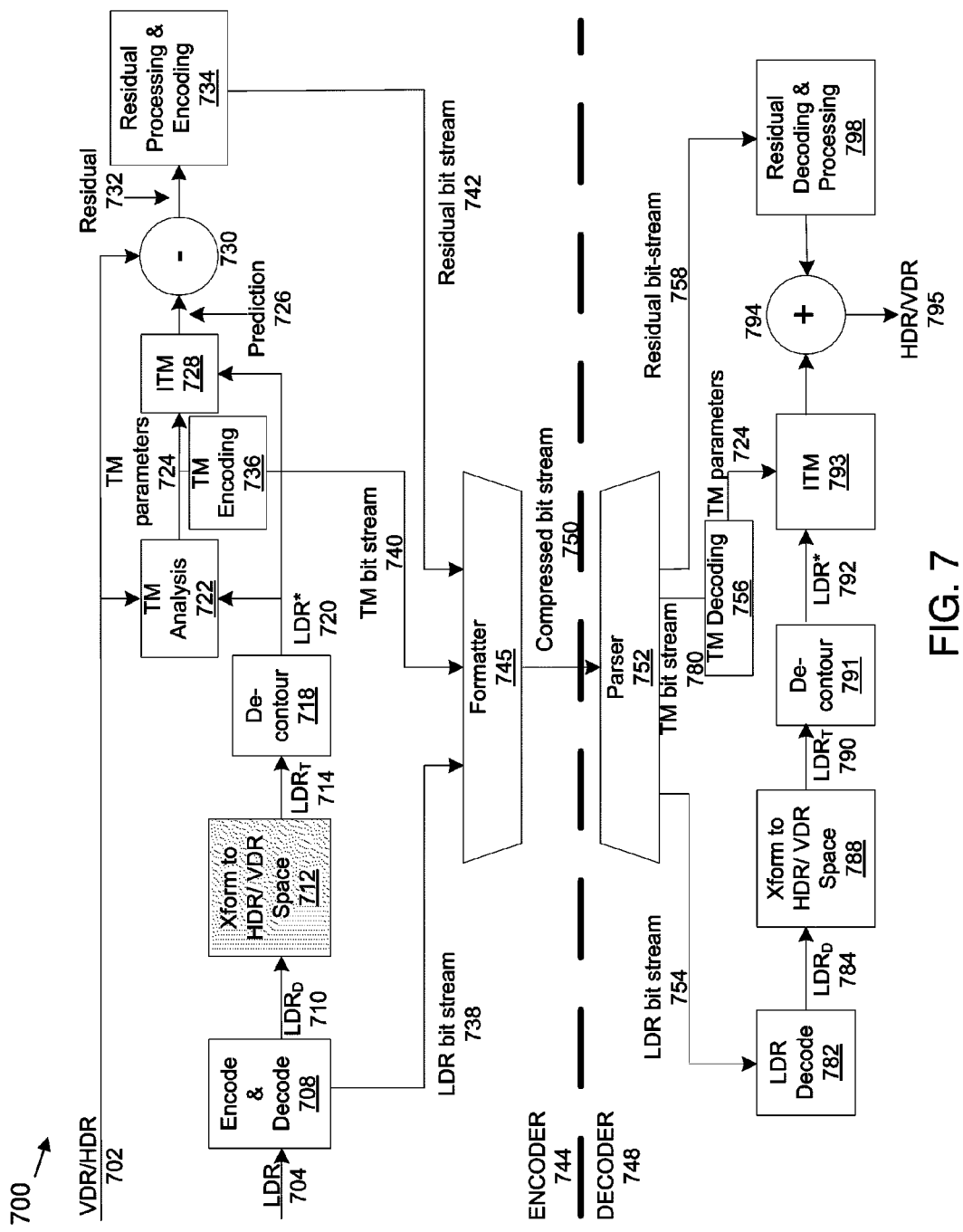
FIG. 7 depicts a block diagram with an example of a compatible codec.

FIG. 7 depicts a block diagram with an example of a codec 700 that may be used, for example, to implement codec 600. The codec 700 has a top portion for the encoder 744 and the bottom portion for the decoder 748. In some cases, the encoder 744 and decoder 748 share many common functions and the decoder may mirror the encoder in several features. In the following, the encoding process is described and then the decoding process is described.

Overview of Codec 700

In the encoder 744 an input SDR image stream 704 is encoded and decoded in an encoder and decoder block 708, and the resulting $LDR_D$ 710, the decoded SDR image stream, is transformed in a transform block 712 to the VDR/HDR space. In this transformation, the luminance $L_D$ and the ($u'_D$, $v'_D$) coordinate representation of the $LDR_D$ is generated and is labeled $LDR_T$ 714. The "De-contour" block 718 can be used to mitigate some of the quantization artifacts in the $LDR_T$ 720 to produce SDR* 720 (e.g., a cleaner SDR image stream) to send to a tone mapping (TM) analysis block 722 and an inverse tone mapping (ITM) block 728. Tone mapping analysis block 722 performs an analysis on SDR* and an input VDR/HDR image stream 702 to determine tone mapping parameters 724 for inverse tone mapping SDR*. TM parameters 724 are sent to the ITM block 728, which uses the TM parameters 724 on SDR* to produce a predicted image portion 726 (e.g., macroblock or frame) as an output. The input VDR/HDR image stream 702 and the output of the ITM block 728 enters a subtractor block 730 to generate the residual 732. A residual bit stream 742 is generated from a residual processing and encoding block 734 that processes and encodes the residual 732. A tone mapping bit stream 740 is generated by encoding the tone mapping TM parameters 724 in a TM encoding block 736. A formatter block 745 receives an encoded SDR bit stream 738 from the encoder and decoder block 708, a TM bit stream 740 from the TM encoding block 736, and a residual bit stream 742 from the residual processing and encoding block 734. The formatter block 745 formats these various bit streams into a compressed bit stream 750.

In the decoder, a parser block 752 receives the compatible bit stream 750 from the formatter block 745. The parser block 752 sends the SDR bit stream 754 to an SDR decoder block 782, the TM bit stream 780 to a TM decoding block 756, and the residual bit stream 758 to a residual decoding and processing block 798 in the decoder. The SDR decoder block 782 produces LDR$_D$ 784, the decoded SDR image stream, which is transformed in a transform block 788 to the VDR/HDR color space. In this transformation, the luminance L$_D$ and the (u'$_D$,v'$_D$) coordinate representation of the LDR$_D$ is generated and is labeled LDR$_T$ 790. The "De-contour" block 791 mitigates some of the quantization artifacts in the LDR$_T$ 790 to produce SDR* 792 to send to an inverse tone mapping (ITM) block 793. The TM decoding block 756 outputs TM parameters 724 to the inverse tone mapping (ITM) block 793. The outputs of the ITM block 793 and the residual decoding and processing block 798 are sent to a summer block 794, and the VDR/HDR output 795 is generated from the summer block 794. Several features of the codec 700 are described below.

Example of Codec 700 Operation

Some features of the blocks of the encoder 744 are described below. Some features of the blocks of the decoder 748 may mirror similar blocks in the encoder 744 to properly decode the encoded bit stream.

The encoding process can begin with encoding the input SDR bit stream 704 to produce an encoded SDR bit stream and then immediately decoding that stream to produce LDR$_D$ 710. In some embodiments, an "exact match" may be enforced in the coding. An "exact match" can mean that the SDR decoder subunit (e.g., encoder and decoder block 708) in the overall encoder 744 and the SDR decoder subunit (e.g., SDR decoder block 782) in the overall decoder 748 are exactly the same. Without an exact match, the decoded image stream LDR$_D$ 710 in the encoder and the analogous stream for LDR$_D$ 784 in the decoder may not be the same. The absence of exact match may cause visible errors in the final image result. A codec with an exact match can be referred to as a "drift-free codec." Other embodiments, however, may use codecs without an exact match requirement, such as in MPEG-2 and MPEG-4 part 2. MPEG-4 part 10 (e.g., H.264/AVC), for example, may enforce exact matching, may be used for the encoder and decoder block 708 and/or the SDR decoder block 782, and may specify a decoder to bit accuracy. In some embodiments, H.264/AVC codecs can be used for systems that produce a base layer (e.g., having the SDR information) and an enhancement layer (e.g., having the additional information to represent VDR/HDR).

In embodiments of the transform block 712, the LDR$_D$ 710 image stream can be converted to a color space of VDR/HDR. In an embodiment, the SDR image stream may have an intensity and color sampling pattern or sampling configuration that meets or exceeds at least a 4:2:0 precision. For example, embodiments may have an intensity and color sampling pattern or sampling configuration of 4:2:0, 4:2:2 and/or 4:4:4. In some embodiments, the VDR/HDR images can be represented using the L$_D$ and (u'$_D$,v'$_D$) color space, as described with respect to FIG. 2. For the case in which SDR images are gamma-encoded R'G'B', the transform example of FIG. 2 may be used as part of the transform block 712 in FIG. 7. In an embodiment of transform block 712, the gamma-correction can be undone to produce linear RGB values. These RGB values can be transformed by a known matrix to produce the CIE XYZ tristimulus values. The CIE XYZ tristimulus values can be transformed into the L$_D$ and (u'$_D$,v'$_D$) color space. The L$_D$ and the (u'$_D$,v'$_D$) representation of LDR$_D$ can be represented as LDR$_T$ 714. Embodiments may function wherein one or more of the base layer or the enhancement layer has a sampling precision that comprises one or more of an intensity and color sampling pattern of 4:2:2 or 4:2:4, or an intensity and color sampling pattern that at least meets or exceeds 4:2:0. Moreover, embodiments may function with a bit depth that at least meets or exceeds 8 bits, e.g., a bit depth of 10-14 bits or more.

In some embodiments, the De-contour block 718 can be designed to mitigate some quantization artifacts that may be present in the LDR$_T$ 714. These quantization artifacts may be due to the 8-bit quantization of LDR$_T$ 714 in comparison to the 12-bit quantization of L$_D$ for VDR or 14-bit quantization for HDR. This mitigation function can be performed using, for example, bilateral filtering. In some embodiments, the De-contour block 718 is optional, as the quantization errors may also be corrected by the residual. Coding efficiency may be enhanced in some codecs that use the De-contour block. The output of the De-contour block 720, or when there is not De-contour block the output LDR$_T$ 714 is sent to the tone mapping analysis block, which uses that input and the VDR/HDR data 702 to model the inverse tone mapping between SDR and the VDR/HDR data 702.

Tone Mapping

There can be at least two types of models for this analysis: one type for global tone mapping, and another type for local tone mapping. In some embodiments, the encoder may first perform the global tone mapping analysis, and then, if necessary, perform a local tone mapping analysis. In some embodiments, either type of tone mapping can be used, and the TM bit stream 740 can include a signal to identify which of the two types is used.

For the global tone mapping analysis, first a functional form for the mapping between SDR and VDR/HDR can be chosen. This functional form may include any number of parameters.

Figure 8:
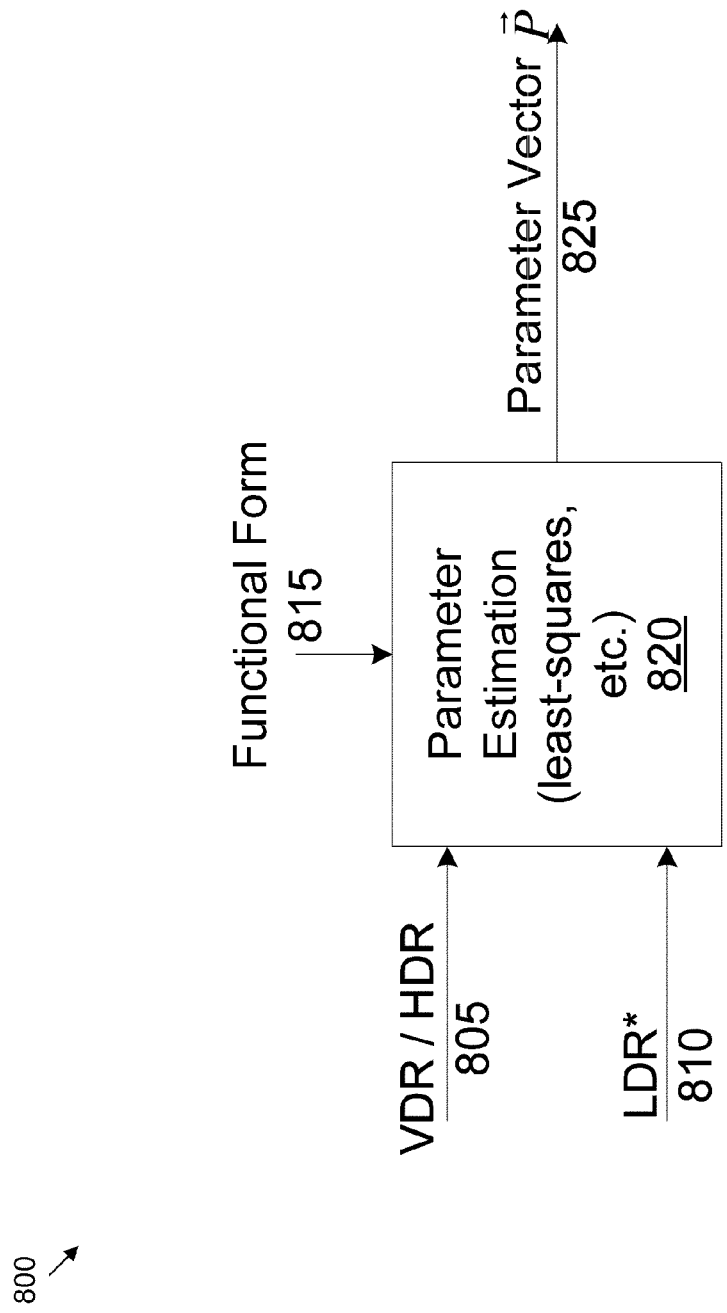
FIG. 8 depicts an example of an architecture for global tone mapping.

FIG. 8 depicts an example of an architecture for global tone mapping 800. FIG. 8 includes a general form for global inverse tone mapping analysis. A parameter estimation block 820 receives an SDR* input 810, an VDR/HDR input 805, and a functional form 815 to produce a parameter vector $\vec{P}$ 825 that represents the parameters of the specific inverse tone mapping function for the inputs. In one example, a polynomial is used as the functional form, as expressed in equation 12.

$$L_D^{VDR/HDR} = TM^{-1}[L_D^{LDR}] = \sum_{n=0}^{N-1} P_n (L_D^{LDR})^n \quad (12)$$

$$\vec{P} = \{P_0, P_1, \ldots, P_{n-1}\}$$

The parameter vector $\vec{P}$ includes the specific coefficients of this polynomial form for the given set of inputs. $L_D^{VDR/HDR}$ represents the L$_D$ for the VDR/HDR, and $L_D^{LDR}$ represents the L$_D$ for the SDR. In some embodiments, by using the L$_D$ values for SDR and VDR/HDR for all the pixels in an image, a least-squares or other error metric estimate can be used to determine the coefficients of the polynomial form for a given set of inputs (e.g., there can be a computation for the parameter estimation 820 of the best fitting polynomial).

Parameterized forms for tone mapping and its inverse can provide enhancements over the reconstruction function at least in terms of noise reduction and monotonicity. In most applications, tone mapping functions can be useful if they are monotonic because if $L_D^{VDR/HDR}$ increases (or decreases) then $L_D^{LDR}$ should also increase (or decrease). Tone mapping functions also should be smooth in order to be utilized in most applications. Otherwise, the tone mapping may introduce unwanted distortions in the residual.

Figure 9:
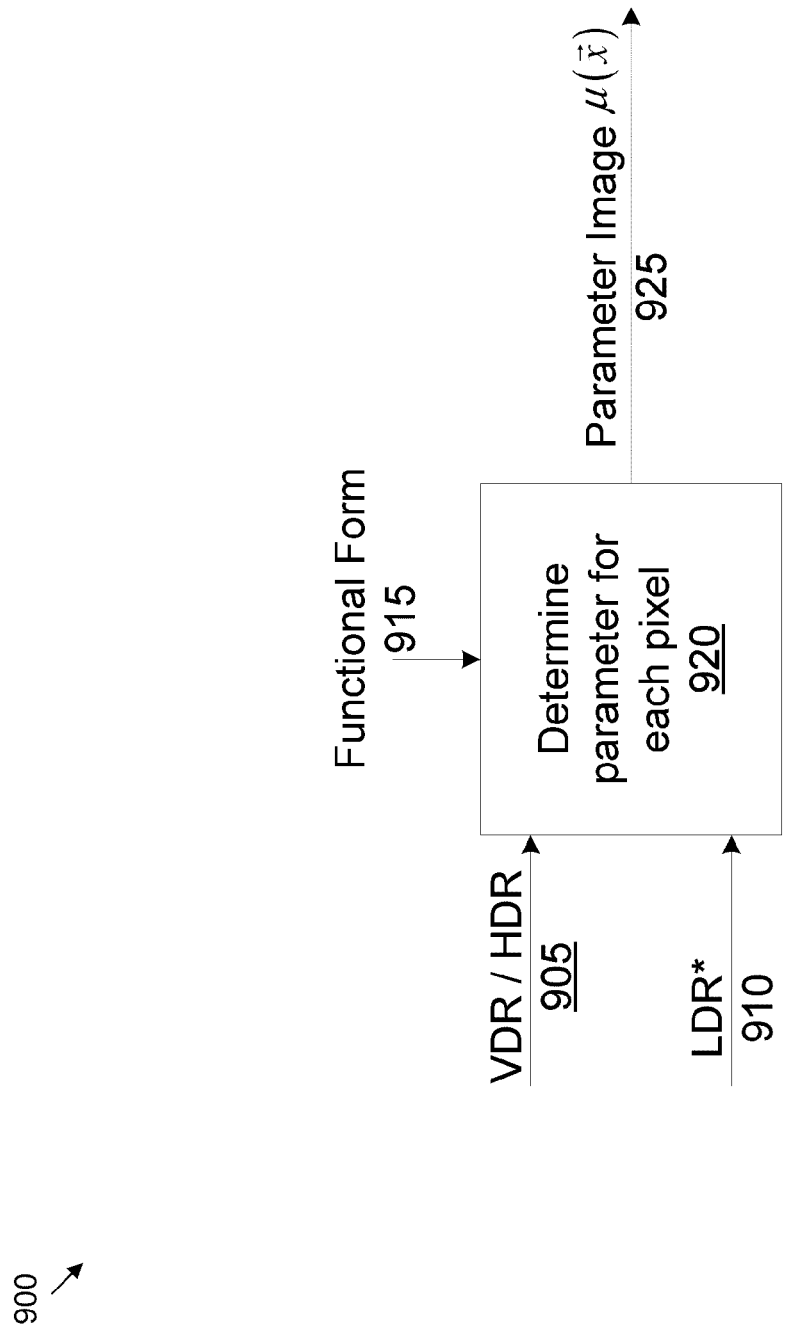
FIG. 9 depicts an example of an architecture for local tone mapping.

FIG. 9 depicts an example of an architecture for local tone mapping. FIG. 9 includes a block 920 to determine at least one parameter for each pixel. The block 920 receives an SDR* input 910, a VDR/HDR input 905, and a functional form 915 to produce a parameter image $\mu(\vec{x})$ 925, where $\vec{x}$ can represent the pixel position in the image. In some embodiments, the analysis in the case of local tone mapping may be similar to global tone mapping. For example, there can be some pre-determined functional form 915 and there can be a computation for one or more parameters of this functional form. One difference for local tone mapping from global tone mapping is that in local tone mapping the functional form can represent a family of tone mapping curves parameterized by, for instance, just a single parameter. For example, a parameterized family like that shown in FIG. 5 could be represented by a family of quadratic curves, as expressed in equation 13, which may be used as the functional form for local tone mapping.

$$L_D^{HDR/VDR} = \begin{cases} -T\mu + (1-2\mu)L_D^{LDR} - \frac{\mu}{T}(L_D^{LDR})^2, & L_D^{LDR} < -T \\ L_D^{LDR}, & -T \le L_D^{LDR} \le T \\ T\mu + (1-2\mu)L_D^{LDR} + \frac{\mu}{T}(L_D^{LDR})^2, & L_D^{LDR} > T. \end{cases} \quad (13)$$

For each pixel, block 920 can determine the appropriate value of $\mu$ and produce a parameter image $\mu(\vec{x})$ that represents the value of the $\mu$ for the pixel position $\vec{x}$.

Figure 10:
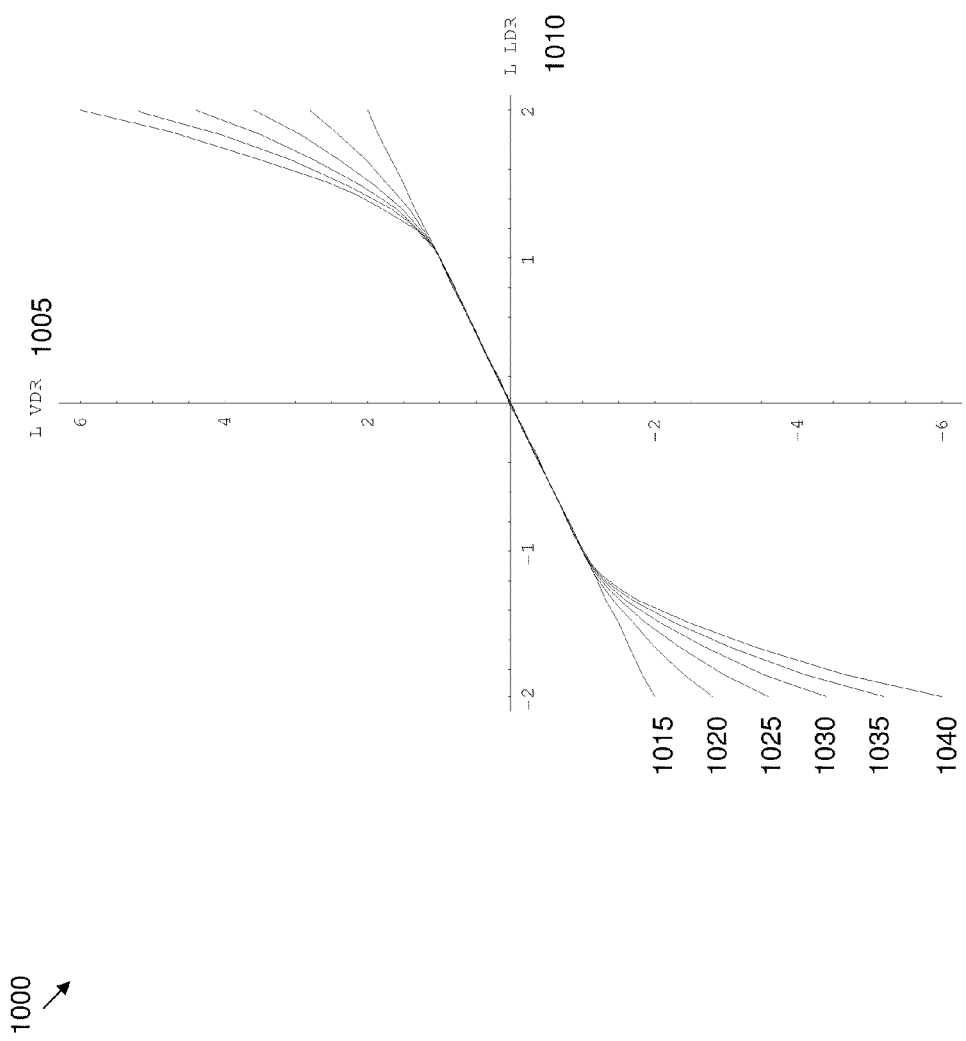
FIG. 10 depicts an example of quadratic parameterized inverse tone mapping.

FIG. 10 depicts an example of quadratic parameterized inverse tone mapping 1000. The example of the quadratic parameterized inverse tone mapping 1000 may be used for the functional form. The family of quadratic curves 1015-1040 are plotted for $L_D^{LDR}$ 1010 versus $L_D^{VDR/HDR}$ 1005. When $\mu=0$, the mapping is just the identity, and as $\mu$ increases, the mapping becomes increasingly S-shaped. Thus, $\mu$ can represent the degree of dodging or burning at a particular pixel.

In some embodiments, any general functions F[ ] and G[ ] can be used to achieve a better representation of the overall inverse tone mapping, as expressed in equation 14.

$$L_D^{VDR/HDR} = \begin{cases} -T - F[-L_D^{LDR} - T], & L_D^{LDR} < -T \\ L_D^{LDR}, & -T \le L_D^{LDR} \le T \\ T + G[L_D^{LDR} - T], & L_D^{LDR} > T \end{cases} \quad (14)$$

The functions F[ ] and G[ ] can be also be estimated from the SDR and VDR/HDR images by analyzing the tone mapping over several small spatial regions in a fashion analogous to that performed over the entire image for global tone mapping.

As described above, the block 920 can solve for $\mu$ as a function of pixel position $\vec{x}$ to produce a parameter image $\mu(\vec{x})$ 925. The parameter image can be smooth and highly compressible depending on the functional form chosen.

In some embodiments, the parameter image can be a piecewise constant over a set of rectangular blocks. This can be a very efficient model because the effects of local tone mapping are often limited to relatively small portions of the image. Various methods to compress the parameter image can be used to compress the motion fields.

In some embodiments, after the tone mapping parameters have been determined, inverse tone mapping (e.g., ITM block 728 in FIG. 7) is performed. Some embodiments of the inverse tone mapping can apply the global or parameterized local inverse tone mapping to SDR* to produce a prediction for the VDR/HDR image. The prediction can be subtracted (e.g., subtractor block 730 in FIG. 7) from the input VDR/HDR to produce the residual 732 and an accurate prediction.

In some embodiments, inaccuracies from a reconstruction function can be avoided. Also, in some embodiments, the residuals can be very small (e.g., usually zero except in regions of very high or very low luminance where tone mapping effects may be largest), which can provide for reduced or minimal processing and/or encoding of the residual. Because the residuals can be zero or close to zero, there may not be much information in the enhancement layer, and therefore, an amount of overhead can be low for these embodiments.

For the color channels, the $(u'_D, v'_D)$ for SDR and VDR can be subtracted to produce the residual. This residual can be non-zero when the VDR/HDR color is outside the gamut of SDR. Since most colors found in the natural world are within or close to the SDR gamut, the $(u'_D, v'_D)$ residual can be zero for the vast majority of pixels. In some cases, while the log-luminance channel may require inverse tone mapping to produce a good estimate for the log-luminance of the HDR or VDR, the $(u'_D, v'_D)$ color channels may not have this requirement.

Figure 11:
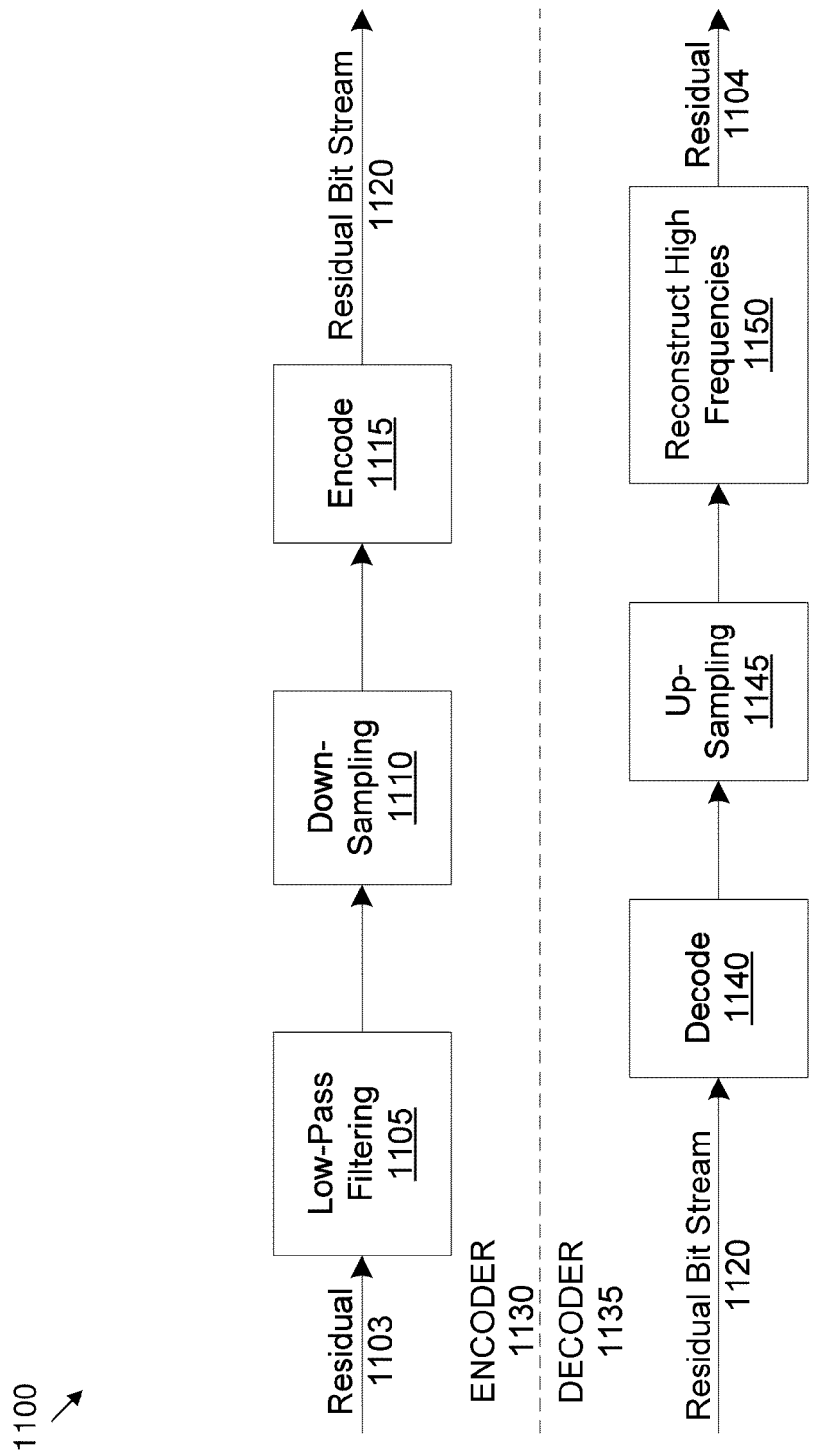
FIG. 11 depicts an example of residual processing.

FIG. 11 depicts an example of residual processing. The residual processing may be used, for example, to implement residual processing blocks 734 and 798. The residual process is shown for a codec that has an encoder 1130 with an input residual 1103 passing through some processes 1105, 1110, 1115 to output a residual bit stream 1120, and a decoder 1135 that has an input residual bit stream 1120 passing through some processes 1140, 1145, 1150 to produce a decoded residual 1104. In the encoder 1130, the input residual 1103 is low-pass filtered 1105, down sampled 1110 (e.g., by 2 in both the horizontal and vertical directions), and encoded 1115 to produce the residual bit stream 1120. In the decoder 1135, the residual bit stream 1120 can be decoded 1140, up-sampled 1145, and the high frequencies removed by the low pass filtering 1105 are reconstructed 1150 in producing the decoded residual 1104. In some embodiments, the residual bit stream can be the same residual bit stream 1120 for both the encoder and the decoder; however, the decoded residual 1104 may not be the same as the original input residual 1103 to be encoded because this encoding can be lossy. Correspondingly, the residual bit stream 742 in the encoder 744 in FIG. 7 may be the same residual bit stream 758 for the decoder 748, and the residual in the decoder 748 may not be the same as the residual 732 in the encoder 744.

If desired, methods to reconstruct high frequency information in the residual, such as those used in JPEG HDR, can be employed in the decoder as shown in FIG. 11. In some embodiments, the down-sampled residual can be encoded 1115 with the same encoder used for SDR 708. The encoder can be an H.264/AVC (Advanced Video Codec)-type encoder (e.g., MPEG-4 Part 10, MPEG-4 AVC), or an equivalent. Some encoders for these embodiments may be referred to as an encoder for an "AVC VDR."

Referring again to FIG. 7, the output of the processing can involve three bit streams: one bit stream for the SDR encoding 738; one bit stream for the tone mapping information 740, and one bit stream for the compressed residual 742. As shown in FIG. 7, these bit streams can be formatted in a manner specific to the SDR encoding method used to produce the compressed bit stream 750. H.264/AVC, and essentially other codecs as well, can provide mechanisms for transmitting such extra information, which may be referred to as "metadata."

When the same bit stream 750 is presented to the decoder, as depicted in FIGS. 7 and 11, the decoder may mirror the encoding process without any need for tone mapping analysis because tone mapping analysis has already been performed by the encoder.

Example

Figure 12A:
FIG. 12A depicts an example of a tone-mapped HDR image.

Some visual results of the disclosed techniques can be illustrated with an example with the residual image obtained using the proposed techniques (e.g., FIGS. 4-11 and related description). In the example, a tone mapped image is shown in FIG. 12A, and the residual image obtained using the proposed techniques (FIG. 12B)). The techniques with less visible residual images can represent the techniques with better coding efficiency and compression.

FIG. 12A depicts an example of a tone-mapped HDR image 1205. The image 1205 shows a frame from the HDR image sequence for a sunset 1207. The dynamic range of the image may be within the SDR luminance range, except for the sunset 1207 of the setting sun and the specular reflections 1208 off the water. This image 1205 has a dynamic range of $10^{6.5}$ and the sunset 1207 and the specular reflections 1208 are tone mapped for this image 1205.

Figure 12B:
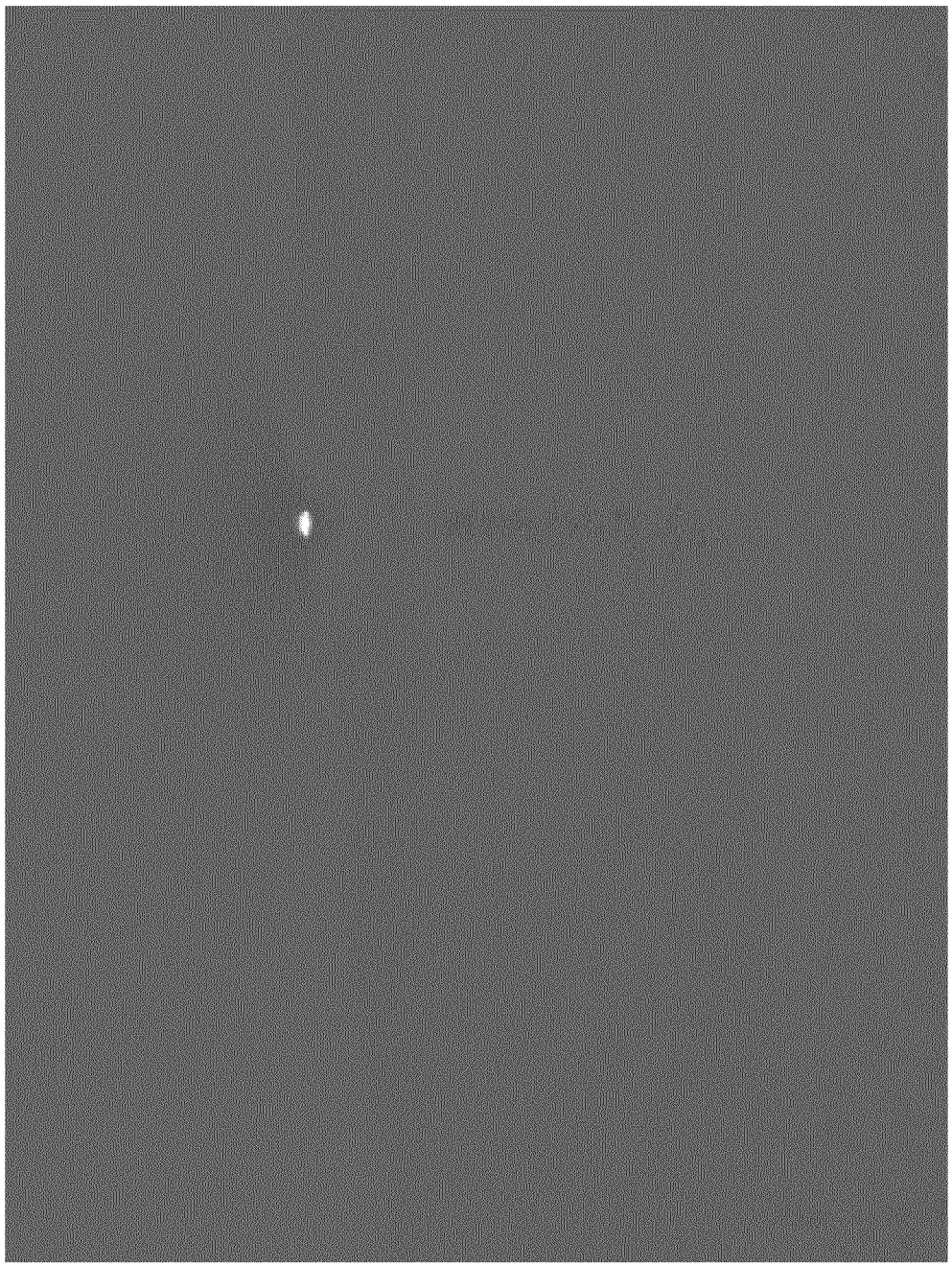
FIG. 12B depicts an example of a residual image with the disclosed techniques.
Figure 12B:

FIG. 12B depicts an example of a residual image 1220. The residual image 1220 can be produced according to a codec such as codec 700. For example, residual image 1220 may be produced with the disclosed techniques (e.g., FIGS. 4-11 and related description). This example used global tone mapping with a fourth-order polynomial form for the inverse tone mapping function. In this residual image 1220 the setting sun is somewhat visible, the specular reflections are somewhat visible but much dimmer, and the rest of the image is invisible or quite faint, essentially below the quantization thresholds used to encode SDR. Using the disclosed techniques, there can be a reduced amount of information to encode with the residual image 1220 of FIG. 12B. Accordingly, the overhead required for data for the residual image 1220 of FIG. 12B in the bit stream can be low.

Example Systems

Figure 13:
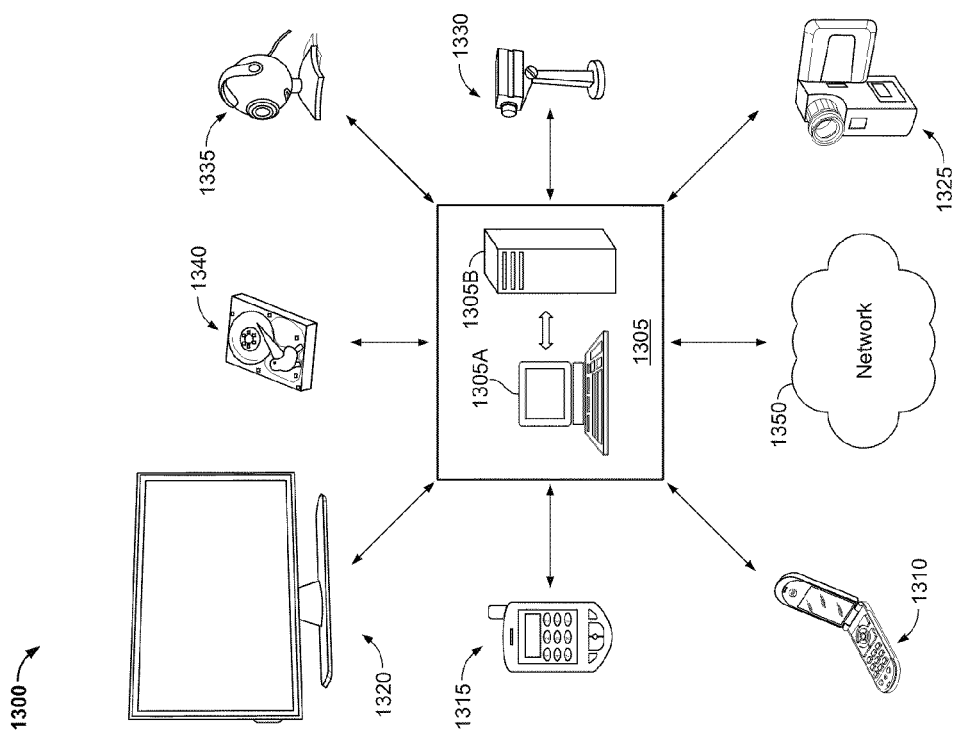
FIG. 13 depicts an example of a system.

FIG. 13 depicts an example of a system that can employ any (or any combination) of the techniques described herein. The techniques can be used on one or more computers 1305A, 1305B. One or more methods (e.g., algorithms and/or processes) herein can be implemented with, tied with, employed on, and/or have data transformed with computers and/or video display 1320, transmission, processing apparatuses, and playback systems. The computers described herein may be any kind of computer, either general purpose, or some specific purpose computer such as a workstation. The computer 1305B may be, e.g., an Intel or AMD based computer, running Windows XP™, Vista™, or Linux™ or may be a Macintosh computer. An embodiment may relate to, e.g., a handheld computer, such as a PDA 1315, cell phone 1310, or laptop 1305A. The computer may also refer to machines or parts of a machine for image recording or reception 1325, 1330, 1335, processing, storage 1340, and distribution of data, in particular video data.

Any combination of the embodiments described herein may be part of a video system and its components. Any combination of the embodiments may be part of a video encoder, as in the example video encoder and/or video decoder of FIG. 7. Any combination of the embodiments may be implemented in hardware and/or software. For example, any of the embodiments may be implemented with a computer program. In some instances, the embodiments may be directed to a particular types of data, such as video data.

Computer and/or graphic programs may be written in C or Python, or Java, Brew or any other programming language. The programs may be resident on a storage medium, e.g., magnetic or optical, e.g., the computer hard drive, a removable disk or media such as a memory stick or SD media, wired or wireless network based or Bluetooth-based (or other) Network Attached Storage (NAS), or other fixed or removable medium. The programs may also be run over a network 1350, for example, with a server or other machine sending communications to the local machine, which allows the local machine to carry out the operations described herein. The network may include a storage area network (SAN).

Although only a few embodiments have been described in detail above, other embodiments are possible. It should be appreciated that embodiments may encompass equivalents and substitutes for one or more of the example techniques described herein. The present specification describes specific examples to accomplish a more general goal in another way. This description should be understood to represent example embodiments and the claims following are intended to cover any equivalent, modification or alternative.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a computer readable medium for execution by, or to control the operation of, data processing apparatus. The computer readable medium can be a machine-readable storage device 1340, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and depicted in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or another programmable logic device (PLD) such as a microcontroller, or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and discs for CD, DVD, and Blu-Ray™ (BD). The processor and the memory can be supplemented by, or incorporated in, special purpose logic circuitry.

To provide for interaction with a user, some embodiments of the subject matter described in this specification can be implemented on a computer having a display device, e.g., a CRT (cathode ray tube), LCD (liquid crystal display), or plasma display monitor 1320, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an embodiment of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software or hardware product or packaged into multiple software or hardware products.

The term "algorithm" can refer to steps, methods, processes, schemes, procedures, operations, programs, guidelines, techniques, sequences, and/or a set of rules or instructions to achieve the results described herein. For example, an algorithm can be a set of video processing instructions for a hardware and/or software video processor. The disclosed algorithms (e.g., such as in the example figures and functional blocks) can be related to and/or tied to video, and can be generated, implemented, associated, and/or employed in video-related systems and/or any devices, machines, hardware, and/or articles of manufacture for the transformation, processing, compression, storage, transmission, reception, testing, calibration, display, and/or any improvement, in any combination, for video data.

The techniques and systems described herein can be combined with and/or tied to other multimedia applications, such as audio, graphics, text, and related data. One or more embodiments of the various types of formulations presented in this disclosure can take into account various display, processing, and/or distortion characteristics. In some aspects, the selection of coding methods can be partially or wholly decided based on the complexity, and/or channel of the modes and/or distortion metrics. As described herein, methods and systems can adaptively adjust coding based on complexity. Various embodiments herein can apply to H.264, AVC, and any other video and image coding methods. The concepts herein can also be extended to and applied in multi-dimensional video, such as 3-D video. Particular embodiments of the disclosure have been described, other embodiments are within the scope of the following claims.

What is claimed is:

1. A method for generating inverse tone mapping parameters, comprising:
receiving a first image stream of a first dynamic range and of a first color space and a second image stream of a second dynamic range in a layered codec;
wherein:
the first dynamic range is lower than the second dynamic range;
the first image stream is in a base layer and the second image stream is in an enhancement layer; and
the layered codec comprises a decoder and an encoder; and encoding the first image stream in the base layer using the encoder to obtain an encoded image stream;

decoding the encoded image stream using the decoder to obtain a decoded image stream;

converting the decoded image stream from the first color space to a second color space different from the first color space to obtain a color converted image stream; and for each of a plurality of pixels of an image of the decoded color converted image stream, generating a respective single inverse tone mapping parameter that parameterizes a tone mapping function of the log luminance of a pixel of the decoded color converted image stream, wherein the tone mapping function comprises a quadratic function of the log luminance of a pixel of the decoded color converted image stream, the quadratic function providing a mapping for the single inverse tone mapping parameter, and wherein the respective single inverse tone mapping parameter is selected wherein the tone mapping function outputs an approximation of the log luminance of a corresponding pixel of the second image stream; and wherein the respective single inverse tone mapping parameter is $\mu$, the log luminance of a pixel of the decoded color converted image stream is $L_D^{LDR}$, the approximation of the log luminance of a corresponding pixel of the second image stream is $L_D^{VDR/HDR}$, and the quadratic function is $$L_D^{HDR/VDR} = \begin{cases} -T\mu + (1-2\mu)L_D^{LDR} - \frac{\mu}{T}(L_D^{LDR})^2, & L_D^{LDR} < -T \\ L_D^{LDR}, & -T \le L_D^{LDR} \le T \\ T\mu + (1-2\mu)L_D^{LDR} + \frac{\mu}{T}(L_D^{LDR})^2, & L_D^{LDR} > T. \end{cases}$$

2. The method as recited in claim 1, wherein the first image stream is obtained by performing tone mapping on the second image stream.

3. The method as recited in claim 2, further comprising inserting data for one or more details from an original image in the second image stream that were lost as a result of creating the first image stream from the original image.

4. The method as recited in claim 1, further comprising generating a higher dynamic range image representation of the color converted image stream to obtain a transformed image stream, wherein the generating a higher dynamic range image representation comprises performing at least one transformation and at least one quantization.

5. The method as recited in claim 1, further comprising:
applying at least one de-contouring operation to the transformed image stream to obtain a de-contoured image stream;
wherein the generating the inverse tone mapping parameters is based on the de-contoured image stream and the second image stream.

6. The method as recited in claim 4, wherein generating the inverse tone mapping parameters is based on the transformed image stream, the second image stream, and a functional form, wherein the functional form provides a relationship between the inverse tone mapping parameters, the transformed image stream, and the second image stream.

7. The method of claim 6, wherein generating the inverse tone mapping parameters comprises calculating least-square errors for each pixel in the transformed image stream and each pixel in the second image stream to estimate the inverse tone mapping parameters.

8. The method of claim 6, wherein the functional form comprises a non-linear or linear form.

9. The method of claim 1, wherein generating the inverse tone mapping parameters is based on less than an entirety of pixels in the second image stream.

10. The method as recited in claim 6, further comprising:
upon generating inverse tone mapping parameters, performing inverse tone mapping on the transformed image stream to obtain a predicted image stream of the second dynamic range;
producing a residual between the predicted image stream and the second image stream; and
processing the residual to obtain a residual bit stream,
wherein the residual comprises a difference between the predicted image stream and the second image stream and is adapted for signaling to a codec decoder.

11. The method as recited in claim 10, wherein the processing the residual comprises:
performing low-pass filtering on the residual to obtain a filtered residual;
performing down-sampling on the filtered residual to obtain a down-sampled residual; and
encoding the down-sampled residual to obtain the residual bit stream.

12. The method as recited in claim 10, further comprising:
encoding the residual to obtain a residual bit stream; and
encoding the inverse tone mapping parameters to obtain an inverse tone mapping parameter bit stream;
wherein the encoded image stream, the residual bit stream, and the inverse tone mapping parameter bit stream are adapted to be signaled to a codec decoder.

13. The method as recited in claim 10, further comprising:
encoding the residual to obtain a residual bit stream;
encoding the inverse tone mapping parameters to obtain an inverse tone mapping parameter bit stream; and
formatting the encoded image stream, the residual bit stream, and the inverse tone mapping parameter bit stream with a formatter block to obtain a compressed bit stream,
wherein the compressed bit stream is adapted to be signaled to a codec decoder.

14. The method as recited in claim 13, further comprising producing an output image stream of the second dynamic range from the codec decoder, which decodes the compressed bit stream, wherein producing the output image stream comprises:
receiving the compressed bit stream;
parsing the compressed encoded bit stream into a third stream of the first dynamic range, a second tone mapping image stream, and a second internal residual image stream;
decoding the third image stream to obtain a second decoded internal image stream,
decoding the second tone mapping image stream to obtain a second decoded tone mapping image stream, and
decoding the second internal residual image stream to obtain a second decoded internal residual image stream;
converting the second decoded internal image stream from the first color space to the second color space to obtain a second decoded color converted image stream;
generating a higher dynamic range image representation of the second decoded color converted image stream to obtain a second transformed image stream;
performing inverse tone mapping on the second transformed image stream based on the second decoded tone mapping image stream to obtain a second predicted image stream of the second dynamic range; and generating the output image stream based on the second decoded internal residual image stream and the second predicted image stream.

15. The method as recited in claim 14, further comprising:
applying at least one de-contouring operation to the second transformed image stream to obtain a second de-contoured image stream,
wherein the performing inverse tone mapping is performed on the second de-contoured image stream based on the second decoded tone mapping image stream.

16. A method for generating an output bit stream from an input bit stream, comprising:
receiving an enhancement layer that comprises the input bit stream, an inverse tone mapping bit stream, and a residual bit stream, wherein the input bit stream is of a first dynamic range and of a first color space;
decoding the input bit stream to obtain a decoded bit stream;
decoding the inverse tone mapping bit stream to obtain a decoded inverse tone mapping bit stream;
decoding the residual bit stream to obtain a decoded residual bit stream;
converting the decoded bit stream from the first color space to a second color space to obtain a decoded color converted image stream;
performing inverse tone mapping on the transformed image stream based on inverse tone mapping parameters of the decoded inverse tone mapping bit stream to obtain a predicted bit stream of a second dynamic range of the output bit stream; and
generating the output bit stream based on the decoded residual bit stream and the predicted bit stream,
wherein the first dynamic range is lower than the second dynamic range; and
wherein the inverse tone mapping comprises, for each of a plurality of pixels of the decoded color converted image stream, applying a respective single one of the inverse tone mapping parameters on a tone mapping function of the log luminance of a pixel of the decoded color converted image stream, wherein the tone mapping function comprises a quadratic function of the log luminance of a pixel of the decoded color converted image stream, the quadratic function providing a mapping for the single inverse tone mapping parameter, and wherein the respective single inverse tone mapping parameter causes the tone mapping function to output the log luminance of a corresponding pixel of the predicted bit stream of the second dynamic range of the output bit stream; and
wherein the respective single inverse tone mapping parameter is μ, the log luminance of a pixel of the decoded color converted image stream is $L_D^{LDR}$, the log luminance of a corresponding pixel of the predicted bit stream of the second dynamic range of the output bit stream is $L_D^{VDR/HDR}$, and the quadratic function is $$L_D^{HDR/VDR} = \begin{cases} -T\mu + (1-2\mu)L_D^{LDR} - \frac{\mu}{T}(L_D^{LDR})^2, & L_D^{LDR} < -T \\ L_D^{LDR}, & -T \leq L_D^{LDR} \leq T \\ T\mu + (1-2\mu)L_D^{LDR} + \frac{\mu}{T}(L_D^{LDR})^2, & L_D^{LDR} > T. \end{cases}$$

17. The method as recited in claim 16, further comprising:
applying at least one de-contouring operation to the transformed image stream to obtain a de-contoured image stream,
wherein the performing inverse tone mapping is performed on the de-contoured image stream based on the decoded inverse tone mapping bit stream.

18. The method as recited in claim 1, wherein the converting comprises performing at least one transformation.

19. The method as recited in claim 18, wherein the first color space comprises at least one of a gamma-encoded R'G'B' color space or a linear color space and the second color space is selected from the group consisting of a CIE XYZ color space and a YCrCb color space.

20. The method as recited in claim 19, wherein a first transformation is from the at least one gamma-encoded R'G'B' color space to an RGB color space or the linear color space is transformed to a second linear color space and a second transformation is from the RGB color space to the second color space.

21. The method as recited in claim 18, wherein the first color space is an RGB color space and the second color space is a selected from the group consisting of a CIE XYZ color space and a YCrCb color space.

22. The method as recited in claim 21, wherein the at least one transformation comprises transforming from the RGB color space to the second color space.

23. The method as recited in claim 1, further comprising generating a higher dynamic range image representation of the color converted image stream to obtain a transformed image stream, wherein generating a higher dynamic range image representation comprises performing projective transformation on one or more chroma components of an output from the converting.

24. A system for generating inverse tone mapping parameters, comprising:
one or more processors; and
one or more storage devices storing instructions that are operable, when executed by the one or more processors, to cause the one or more processors to perform operations comprising:
receiving a first image stream of a first dynamic range and of a first color space and a second image stream of a second dynamic range in a layered codec;
wherein:
the first dynamic range is lower than the second dynamic range;
the first image stream is in a base layer and the second image stream is in an enhancement layer; and
the layered codec comprises a decoder and an encoder;
encoding the first image stream in the base layer using the encoder to obtain an encoded image stream;
decoding the encoded image stream using the decoder to obtain a decoded image stream;
converting the decoded image stream from the first color space to a second color space different from the first color space to obtain a color converted image stream; and
for each of a plurality of pixels of an image of the decoded color converted image stream, generating a respective single inverse tone mapping parameter that parameterizes a tone mapping function of the log luminance of a pixel of the decoded color converted image stream, wherein the tone mapping function comprises a quadratic function of the log luminance of a pixel of the decoded color converted image stream, the quadratic function providing a mapping for the single inverse tone mapping parameter, and wherein the respective single inverse tone mapping parameter is selected wherein the tone mapping function outputs an approximation of the log luminance of a corresponding pixel of the second image stream; and wherein the respective single inverse tone mapping parameter is μ, the log luminance of a pixel of the decoded color converted image stream is $L_D^{LDR}$, the approximation of the log luminance of a corresponding pixel of the second image stream is $L_D^{VDR/HDR}$, and the quadratic function is $$L_D^{HDR/VDR} = \begin{cases} -T\mu + (1-2\mu)L_D^{LDR} - \frac{\mu}{T}(L_D^{LDR})^2, & L_D^{LDR} < -T \\ L_D^{LDR}, & -T \leq L_D^{LDR} \leq T \\ T\mu + (1-2\mu)L_D^{LDR} + \frac{\mu}{T}(L_D^{LDR})^2, & L_D^{LDR} > T. \end{cases}$$

25. A system for generating an output bit stream from an input bit stream, comprising:
one or more processors; and
one or more storage devices storing instructions that are operable, when executed by the one or more processors, to cause the one or more processors to perform operations comprising:
receiving an enhancement layer that comprises the input bit stream, an inverse tone mapping bit stream, and a residual bit stream, wherein the input bit stream is of a first dynamic range and of a first color space;
decoding the input bit stream to obtain a decoded bit stream;
decoding the inverse tone mapping bit stream to obtain a decoded inverse tone mapping bit stream;
decoding the residual bit stream to obtain a decoded residual bit stream;
converting the decoded bit stream from the first color space to a second color space to obtain a decoded color converted image stream;
performing inverse tone mapping on the transformed image stream based on inverse tone mapping parameters of the decoded inverse tone mapping bit stream to obtain a predicted bit stream of a second dynamic range of the output bit stream; and
generating the output bit stream based on the decoded residual bit stream and the predicted bit stream,
wherein the first dynamic range is lower than the second dynamic range; and
wherein the inverse tone mapping comprises, for each of a plurality of pixels of the decoded color converted image stream, applying a respective single one of the inverse tone mapping parameters on a tone mapping function of the log luminance of a pixel of the decoded color converted image stream, wherein the tone mapping function comprises a quadratic function of the log luminance of a pixel of the decoded color converted image stream, the quadratic function providing a mapping for the single inverse tone mapping parameter, and wherein the respective single inverse tone mapping parameter causes the tone mapping function to output the log luminance of a corresponding pixel of the predicted bit stream of the second dynamic range of the output bit stream; and
wherein the respective single inverse tone mapping parameter is μ, the log luminance of a pixel of the decoded color converted image stream is $L_D^{LDR}$, the log luminance of a corresponding pixel of the predicted bit stream of the second dynamic range of the output bit stream is $L_D^{VDR/HDR}$, and the quadratic function is $$L_D^{HDR/VDR} = \begin{cases} -T\mu + (1-2\mu)L_D^{LDR} - \frac{\mu}{T}(L_D^{LDR})^2, & L_D^{LDR} < -T \\ L_D^{LDR}, & -T \leq L_D^{LDR} \leq T \\ T\mu + (1-2\mu)L_D^{LDR} + \frac{\mu}{T}(L_D^{LDR})^2, & L_D^{LDR} > T. \end{cases}$$

26. A non-transitory computer readable storage medium comprising code, which when executed by one or more processors, causes the one or more processors to perform a process for generating inverse tone mapping parameters, the process comprising:
receiving a first image stream of a first dynamic range and of a first color space and a second image stream of a second dynamic range in a layered codec;
wherein:
the first dynamic range is lower than the second dynamic range;
the first image stream is in a base layer and the second image stream is in an enhancement layer;
the layered codec comprises a decoder and an encoder; and
encoding the first image stream in the base layer using the encoder to obtain an encoded image stream;
decoding the encoded image stream using the decoder to obtain a decoded image stream;
converting the decoded image stream from the first color space to a second color space different from the first color space to obtain a color converted image stream; and
for each of a plurality of pixels of an image of the decoded color converted image stream, generating a respective single inverse tone mapping parameter that parameterizes a tone mapping function of the log luminance of a pixel of the decoded color converted image stream, wherein the tone mapping function comprises a quadratic function of the log luminance of a pixel of the decoded color converted image stream, the quadratic function providing a mapping for the single inverse tone mapping parameter, and wherein the respective single inverse tone mapping parameter is selected wherein the tone mapping function outputs an approximation of the log luminance of a corresponding pixel of the second image stream; and
wherein the respective single inverse tone mapping parameter is μ, the log luminance of a pixel of the decoded color converted image stream is $L_D^{LDR}$, the approximation of the log luminance of a corresponding pixel of the second image stream is $L_D^{VDR/HDR}$, and the quadratic function is $$L_D^{HDR/VDR} = \begin{cases} -T\mu + (1-2\mu)L_D^{LDR} - \frac{\mu}{T}(L_D^{LDR})^2, & L_D^{LDR} < -T \\ L_D^{LDR}, & -T \leq L_D^{LDR} \leq T \\ T\mu + (1-2\mu)L_D^{LDR} + \frac{\mu}{T}(L_D^{LDR})^2, & L_D^{LDR} > T. \end{cases}$$

27. A non-transitory computer readable storage medium comprising code, which when executed by one or more, causes the one or more processors to perform a process for generating an output bit stream from an input bit stream, the process comprising:
receiving an enhancement layer that comprises the input bit stream, an inverse tone mapping bit stream, and a residual bit stream, wherein the input bit stream is of a first dynamic range and of a first color space;

decoding the input bit stream to obtain a decoded bit stream;

decoding the inverse tone mapping bit stream to obtain a decoded inverse tone mapping bit stream;

decoding the residual bit stream to obtain a decoded residual bit stream;

converting the decoded bit stream from the first color space to a second color space to obtain a decoded color converted image stream;

performing inverse tone mapping on the transformed image stream based on inverse tone mapping parameters of the decoded inverse tone mapping bit stream to obtain a predicted bit stream of a second dynamic range of the output bit stream; and generating the output bit stream based on the decoded residual bit stream and the predicted bit stream, wherein the first dynamic range is lower than the second dynamic range; and wherein the inverse tone mapping comprises, for each of a plurality of pixels of the decoded color converted image stream, applying a respective single one of the inverse tone mapping parameters on a tone mapping function of the log luminance of a pixel of the decoded color converted image stream, wherein the tone mapping function comprises a quadratic function of the log luminance of a pixel of the decoded color converted image stream, the quadratic function providing a mapping for the single inverse tone mapping parameter, and wherein the respective single inverse tone mapping parameter causes the tone mapping function to output the log luminance of a corresponding pixel of the predicted bit stream of the second dynamic range of the output bit stream; and wherein the respective single inverse tone mapping parameter is $\mu$, the log luminance of a pixel of the decoded color converted image stream is $L_D^{LDR}$, the log luminance of a corresponding pixel of the predicted bit stream of the second dynamic range of the output bit stream is $L_D^{VDR/HDR}$, and the quadratic function is $$L_D^{HDR/VDR} = \begin{cases} -T\mu + (1-2\mu)L_D^{LDR} - \frac{\mu}{T}(L_D^{LDR})^2, & L_D^{LDR} < -T \\ L_D^{LDR}, & -T \leq L_D^{LDR} \leq T \\ T\mu + (1-2\mu)L_D^{LDR} + \frac{\mu}{T}(L_D^{LDR})^2, & L_D^{LDR} > T. \end{cases}$$

28. The method as recited in claim 16, wherein the converting comprises performing at least one transformation.

29. The method as recited in claim 16, further comprising generating a higher dynamic range image representation of the color converted image stream to obtain a transformed image stream, wherein generating a higher dynamic range image representation comprises performing projective transformation on one or more chroma components of an output from the converting.

* * * * *